US012525083B2

(12) United States Patent
Moles et al.

(10) Patent No.: US 12,525,083 B2
(45) Date of Patent: Jan. 13, 2026

(54) DISTRIBUTED ALGORITHM FOR AUTOMIXING SPEECH OVER WIRELESS NETWORKS

(71) Applicant: Shure Acquisition Holdings, Inc., Niles, IL (US)

(72) Inventors: Steven Christopher Moles, Lincolnshire, IL (US); Stephen David Moore, Livingston (GB); Michael Ryan Lester, Colorado Springs, CO (US)

(73) Assignee: Shure Acquisition Holdings, Inc., Niles, IL (US)

( * ) Notice: Subject to any disclaimer, the term of this patent is extended or adjusted under 35 U.S.C. 154(b) by 508 days.

(21) Appl. No.: 18/051,658

(22) Filed: Nov. 1, 2022

(65) Prior Publication Data

US 2023/0147230 A1 May 11, 2023

Related U.S. Application Data

(60) Provisional application No. 63/263,641, filed on Nov. 5, 2021.

(51) Int. Cl.
*G07C 9/25* (2020.01)
*G10L 17/00* (2013.01)
(Continued)

(52) U.S. Cl.
CPC ................ *G07C 9/25* (2020.01); *G10L 17/00* (2013.01); *H04R 1/406* (2013.01); *H04R 3/005* (2013.01); *H04R 2420/07* (2013.01)

(58) Field of Classification Search
CPC ...... H04R 3/005; H04R 3/12; H04R 2430/01; H04R 1/403; H04R 1/406; H04R 2420/07
(Continued)

(56) References Cited

U.S. PATENT DOCUMENTS 1,535,408 A 4/1925 Fricke
1,540,788 A 6/1925 McClure
(Continued)

FOREIGN PATENT DOCUMENTS

AU 2004200802 3/2004
BE 775247 3/1972
(Continued)

OTHER PUBLICATIONS

SM 69 Stereo Microphone, Datasheet, Georg Neumann GmbH, Available at <https://ende.neumann.com/product_files/6552/download>, 1 p.
(Continued)

*Primary Examiner* — Disler Paul
(74) *Attorney, Agent, or Firm* — Neal, Gerber & Eisenberg LLP

(57) ABSTRACT

Systems and methods are disclosed for operating a wireless audio network including a plurality of wireless microphone units (e.g., wireless delegate units) and a central access point having a mixer. The wireless microphone units may perform voice detection and level sensing, and make a preliminary gating decision. The central access point may make a final gating decision, determine the granting of wireless communications channels, and generate a final mixed audio output signal.

21 Claims, 4 Drawing Sheets

(51) Int. Cl.
*H04R 1/40* (2006.01)
*H04R 3/00* (2006.01)

(58) Field of Classification Search
USPC ........................................ 381/56–58, 119, 92
See application file for complete search history.

(56) References Cited

U.S. PATENT DOCUMENTS

| | | | |
|---|---|---|---|
| 1,965,830 | A | 7/1934 | Hammer |
| 2,075,588 | A | 3/1937 | Meyers |
| 2,113,219 | A | 4/1938 | Olson |
| 2,164,655 | A | 7/1939 | Kleerup |
| D122,771 | S | 10/1940 | Doner |
| 2,233,412 | A | 3/1941 | Hill |
| 2,268,529 | A | 12/1941 | Stiles |
| 2,343,037 | A | 2/1944 | Adelman |
| 2,377,449 | A | 6/1945 | Prevette |
| 2,481,250 | A | 9/1949 | Schneider |
| 2,521,603 | A | 9/1950 | Prew |
| 2,533,565 | A | 12/1950 | Eichelman |
| 2,539,671 | A | 1/1951 | Olson |
| 2,777,232 | A | 1/1957 | Kulicke |
| 2,828,508 | A | 4/1958 | Labarre |
| 2,840,181 | A | 6/1958 | Wildman |
| 2,882,633 | A | 4/1959 | Howell |
| 2,912,605 | A | 11/1959 | Tibbetts |
| 2,938,113 | A | 5/1960 | Schnell |
| 2,950,556 | A | 8/1960 | Larios |
| 3,019,854 | A | 2/1962 | Obryant |
| 3,132,713 | A | 5/1964 | Seeler |
| 3,143,182 | A | 8/1964 | Sears |
| 3,160,225 | A | 12/1964 | Sechrist |
| 3,161,975 | A | 12/1964 | McMillan |
| 3,205,601 | A | 9/1965 | Gawne |
| 3,239,973 | A | 3/1966 | Hannes |
| 3,240,883 | A | 3/1966 | Seeler |
| 3,310,901 | A | 3/1967 | Sarkisian |
| 3,321,170 | A | 5/1967 | Vye |
| 3,509,290 | A | 4/1970 | Mochida |
| 3,573,399 | A | 4/1971 | Schroeder |
| 3,657,490 | A | 4/1972 | Scheiber |
| 3,696,885 | A | 10/1972 | Grieg |
| 3,699,271 | A | 10/1972 | Berkley |
| 3,755,625 | A | 8/1973 | Maston |
| 3,828,508 | A | 8/1974 | Moeller |
| 3,857,191 | A | 12/1974 | Sadorus |
| 3,895,194 | A | 7/1975 | Fraim |
| 3,906,431 | A | 9/1975 | Clearwaters |
| D237,103 | S | 10/1975 | Fisher |
| 3,936,606 | A | 2/1976 | Wanke |
| 3,938,617 | A | 2/1976 | Forbes |
| 3,941,638 | A | 3/1976 | Horky |
| 3,992,584 | A | 11/1976 | Dugan |
| 4,007,461 | A | 2/1977 | Luedtke |
| 4,008,408 | A | 2/1977 | Kodama |
| 4,029,170 | A | 6/1977 | Phillips |
| 4,032,725 | A | 6/1977 | McGee |
| 4,070,547 | A | 1/1978 | Dellar |
| 4,072,821 | A | 2/1978 | Bauer |
| 4,096,353 | A | 6/1978 | Bauer |
| 4,127,156 | A | 11/1978 | Brandt |
| 4,131,760 | A | 12/1978 | Christensen |
| 4,169,219 | A | 9/1979 | Beard |
| 4,184,048 | A | 1/1980 | Alcaide |
| 4,198,705 | A | 4/1980 | Massa |
| D255,234 | S | 6/1980 | Wellward |
| D256,015 | S | 7/1980 | Doherty |
| 4,212,133 | A | 7/1980 | Lufkin |
| 4,237,339 | A | 12/1980 | Bunting |
| 4,244,096 | A | 1/1981 | Kashichi |
| 4,244,906 | A | 1/1981 | Heinemann |
| 4,254,417 | A | 3/1981 | Speiser |
| 4,275,694 | A | 6/1981 | Nagaishi |
| 4,296,280 | A | 10/1981 | Richie |
| 4,305,141 | A | 12/1981 | Massa |
| 4,308,425 | A | 12/1981 | Momose |
| 4,311,874 | A | 1/1982 | Wallace, Jr. |
| 4,330,691 | A | 5/1982 | Gordon |
| 4,334,740 | A | 6/1982 | Wray |
| 4,365,449 | A | 12/1982 | Liautaud |
| 4,373,191 | A | 2/1983 | Fette |
| 4,393,631 | A | 7/1983 | Krent |
| 4,414,433 | A | 11/1983 | Horie |
| 4,429,850 | A | 2/1984 | Weber |
| 4,436,966 | A | 3/1984 | Botros |
| 4,449,238 | A | 5/1984 | Lee |
| 4,466,117 | A | 8/1984 | Rudolf |
| 4,485,484 | A | 11/1984 | Flanagan |
| 4,489,442 | A | 12/1984 | Anderson |
| 4,518,826 | A | 5/1985 | Caudill |
| 4,521,908 | A | 6/1985 | Miyaji |
| 4,566,557 | A | 1/1986 | Lemaitre |
| 4,593,404 | A | 6/1986 | Bolin |
| 4,594,478 | A | 6/1986 | Gumb |
| D285,067 | S | 8/1986 | Delbuck |
| 4,625,827 | A | 12/1986 | Bartlett |
| 4,653,102 | A | 3/1987 | Hansen |
| 4,658,425 | A | 4/1987 | Julstrom |
| 4,669,108 | A | 5/1987 | Deinzer |
| 4,675,906 | A | 6/1987 | Sessler |
| 4,693,174 | A | 9/1987 | Anderson |
| 4,696,043 | A | 9/1987 | Iwahara |
| 4,712,231 | A | 12/1987 | Julstrom |
| 4,741,038 | A | 4/1988 | Elko |
| 4,752,961 | A | 6/1988 | Kahn |
| 4,768,086 | A | 8/1988 | Paist |
| 4,805,730 | A | 2/1989 | O'Neill |
| 4,815,132 | A | 3/1989 | Minami |
| 4,860,366 | A | 8/1989 | Fukushi |
| 4,862,507 | A | 8/1989 | Woodard |
| 4,866,868 | A | 9/1989 | Kass |
| 4,881,135 | A | 11/1989 | Heilweil |
| 4,888,807 | A | 12/1989 | Reichel |
| 4,903,247 | A | 2/1990 | Van Gerwen |
| 4,923,032 | A | 5/1990 | Nuernberger |
| 4,928,312 | A | 5/1990 | Hill |
| 4,969,197 | A | 11/1990 | Takaya |
| 5,000,286 | A | 3/1991 | Crawford |
| 5,038,935 | A | 8/1991 | Wenkman |
| 5,058,170 | A | 10/1991 | Kanamori |
| 5,088,574 | A | 2/1992 | Kertesz, III |
| D324,780 | S | 3/1992 | Sebesta |
| 5,121,426 | A | 6/1992 | Baumhauer |
| D329,239 | S | 9/1992 | Hahn |
| 5,189,701 | A | 2/1993 | Jain |
| 5,204,907 | A | 4/1993 | Staple |
| 5,214,709 | A | 5/1993 | Ribic |
| 5,224,170 | A | 6/1993 | Waite, Jr. |
| D340,718 | S | 10/1993 | Leger |
| 5,289,544 | A | 2/1994 | Franklin |
| D345,346 | S | 3/1994 | Alfonso |
| D345,379 | S | 3/1994 | Chan |
| 5,297,210 | A | 3/1994 | Julstrom |
| 5,322,979 | A | 6/1994 | Cassity |
| 5,323,459 | A | 6/1994 | Hirano |
| 5,329,593 | A | 7/1994 | Lazzeroni |
| 5,335,011 | A | 8/1994 | Addeo |
| 5,353,279 | A | 10/1994 | Koyama |
| 5,359,374 | A | 10/1994 | Schwartz |
| 5,371,789 | A | 12/1994 | Hirano |
| 5,383,293 | A | 1/1995 | Royal |
| 5,384,843 | A | 1/1995 | Masuda |
| 5,396,554 | A | 3/1995 | Hirano |
| 5,400,413 | A | 3/1995 | Kindel |
| D363,045 | S | 10/1995 | Phillips |
| 5,473,701 | A | 12/1995 | Cezanne |
| 5,509,634 | A | 4/1996 | Gebka |
| 5,513,265 | A | 4/1996 | Hirano |
| 5,525,765 | A | 6/1996 | Freiheit |
| 5,550,924 | A | 8/1996 | Helf |
| 5,550,925 | A | 8/1996 | Hori |
| 5,555,447 | A | 9/1996 | Kotzin |
| 5,574,793 | A | 11/1996 | Hirschhorn |
| 5,602,962 | A | 2/1997 | Kellermann |

(56) References Cited

U.S. PATENT DOCUMENTS

| | | | |
|---|---|---|---|
| 5,612,929 | A | 3/1997 | Lopes |
| 5,633,936 | A | 5/1997 | Oh |
| 5,645,257 | A | 7/1997 | Ward |
| D382,118 | S | 8/1997 | Ferrero |
| 5,657,393 | A | 8/1997 | Crow |
| 5,661,813 | A | 8/1997 | Shimauchi |
| 5,673,327 | A | 9/1997 | Julstrom |
| 5,687,229 | A | 11/1997 | Sih |
| 5,706,344 | A | 1/1998 | Finn |
| 5,715,319 | A | 2/1998 | Chu |
| 5,717,171 | A | 2/1998 | Miller |
| D392,977 | S | 3/1998 | Kim |
| D394,061 | S | 5/1998 | Fink |
| 5,761,318 | A | 6/1998 | Shimauchi |
| 5,766,702 | A | 6/1998 | Lin |
| 5,787,183 | A | 7/1998 | Chu |
| 5,796,819 | A | 8/1998 | Romesburg |
| 5,848,146 | A | 12/1998 | Slattery |
| 5,870,482 | A | 2/1999 | Loeppert |
| 5,878,147 | A | 3/1999 | Killion |
| 5,888,412 | A | 3/1999 | Sooriakumar |
| 5,888,439 | A | 3/1999 | Miller |
| D416,315 | S | 11/1999 | Nanjo |
| 5,978,211 | A | 11/1999 | Hong |
| 5,991,277 | A | 11/1999 | Maeng |
| 6,035,962 | A | 3/2000 | Lin |
| 6,039,457 | A | 3/2000 | O'Neal |
| 6,041,127 | A | 3/2000 | Elko |
| 6,049,607 | A | 4/2000 | Marash |
| D424,538 | S | 5/2000 | Hayashi |
| 6,069,961 | A | 5/2000 | Nakazawa |
| 6,125,179 | A | 9/2000 | Wu |
| D432,518 | S | 10/2000 | Muto |
| 6,128,395 | A | 10/2000 | De Vries |
| 6,137,887 | A | 10/2000 | Anderson |
| 6,144,746 | A | 11/2000 | Azima |
| 6,151,399 | A | 11/2000 | Killion |
| 6,173,059 | B1 | 1/2001 | Huang |
| 6,198,831 | B1 | 3/2001 | Azima |
| 6,205,224 | B1 | 3/2001 | Underbrink |
| 6,215,881 | B1 | 4/2001 | Azima |
| 6,266,427 | B1 | 7/2001 | Mathur |
| 6,285,770 | B1 | 9/2001 | Azima |
| 6,301,357 | B1 | 10/2001 | Romesburg |
| 6,329,908 | B1 | 12/2001 | Frecska |
| 6,332,029 | B1 | 12/2001 | Azima |
| D453,016 | S | 1/2002 | Nevill |
| 6,386,315 | B1 | 5/2002 | Roy |
| 6,393,129 | B1 | 5/2002 | Conrad |
| 6,424,635 | B1 | 7/2002 | Song |
| 6,442,272 | B1 | 8/2002 | Osovets |
| 6,449,593 | B1 | 9/2002 | Valve |
| 6,481,173 | B1 | 11/2002 | Roy |
| 6,488,367 | B1 | 12/2002 | Debesis |
| D469,090 | S | 1/2003 | Tsuji |
| 6,505,057 | B1 | 1/2003 | Finn |
| 6,507,659 | B1 | 1/2003 | Iredale |
| 6,510,919 | B1 | 1/2003 | Roy |
| 6,526,147 | B1 | 2/2003 | Rung |
| 6,556,682 | B1 | 4/2003 | Gilloire |
| 6,592,237 | B1 | 7/2003 | Pledger |
| 6,622,030 | B1 | 9/2003 | Romesburg |
| D480,923 | S | 10/2003 | Neubourg |
| 6,633,647 | B1 | 10/2003 | Markow |
| 6,665,971 | B2 | 12/2003 | Lowry |
| 6,694,028 | B1 | 2/2004 | Matsuo |
| 6,704,422 | B1 | 3/2004 | Jensen |
| D489,707 | S | 5/2004 | Kobayashi |
| 6,731,334 | B1 | 5/2004 | Maeng |
| 6,741,720 | B1 | 5/2004 | Myatt |
| 6,757,393 | B1 | 6/2004 | Spitzer |
| 6,768,795 | B2 | 7/2004 | Jimen |
| 6,868,377 | B1 | 3/2005 | Laroche |
| 6,885,750 | B2 | 4/2005 | Egelmeers |
| 6,885,986 | B1 | 4/2005 | Gigi |
| D504,889 | S | 5/2005 | Andre |
| 6,889,183 | B1 | 5/2005 | Gunduzhan |
| 6,895,093 | B1 | 5/2005 | Ali |
| 6,931,123 | B1 | 8/2005 | Hughes |
| 6,944,312 | B2 | 9/2005 | Mason |
| D510,729 | S | 10/2005 | Chen |
| 6,968,064 | B1 | 11/2005 | Ning |
| 6,990,193 | B2 | 1/2006 | Beaucoup |
| 6,993,126 | B1 | 1/2006 | Kyrylenko |
| 6,993,145 | B2 | 1/2006 | Combest |
| 7,003,099 | B1 | 2/2006 | Zhang |
| 7,013,267 | B1 | 3/2006 | Huart |
| 7,031,269 | B2 | 4/2006 | Lee |
| 7,035,398 | B2 | 4/2006 | Matsuo |
| 7,035,415 | B2 | 4/2006 | Belt |
| 7,050,576 | B2 | 5/2006 | Zhang |
| 7,054,451 | B2 | 5/2006 | Janse |
| D526,643 | S | 8/2006 | Ishizaki |
| D527,372 | S | 8/2006 | Allen |
| 7,092,516 | B2 | 8/2006 | Furuta |
| 7,092,882 | B2 | 8/2006 | Arrowood |
| 7,098,865 | B2 | 8/2006 | Christensen |
| 7,106,876 | B2 | 9/2006 | Santiago |
| 7,120,269 | B2 | 10/2006 | Lowell |
| 7,130,309 | B2 | 10/2006 | Boaz |
| D533,177 | S | 12/2006 | Andre |
| 7,149,320 | B2 | 12/2006 | Haykin |
| 7,161,534 | B2 | 1/2007 | Tsai |
| 7,187,765 | B2 | 3/2007 | Popovic |
| 7,203,308 | B2 | 4/2007 | Kubota |
| D542,543 | S | 5/2007 | Bruce |
| 7,212,628 | B2 | 5/2007 | Popovic |
| D546,318 | S | 7/2007 | Yoon |
| D546,814 | S | 7/2007 | Takita |
| D547,748 | S | 7/2007 | Tsuge |
| 7,239,714 | B2 | 7/2007 | De Blok |
| D549,673 | S | 8/2007 | Niitsu |
| 7,269,263 | B2 | 9/2007 | Dedieu |
| D552,570 | S | 10/2007 | Niitsu |
| D559,553 | S | 1/2008 | Mischel |
| 7,333,476 | B2 | 2/2008 | LeBlanc |
| D566,685 | S | 4/2008 | Koller |
| 7,359,504 | B1 | 4/2008 | Reuss |
| 7,366,310 | B2 | 4/2008 | Stinson |
| 7,387,151 | B1 | 6/2008 | Payne |
| 7,412,376 | B2 | 8/2008 | Florencio |
| 7,415,117 | B2 | 8/2008 | Tashev |
| D578,509 | S | 10/2008 | Thomas |
| D581,510 | S | 11/2008 | Albano |
| D582,391 | S | 12/2008 | Morimoto |
| D587,709 | S | 3/2009 | Niitsu |
| D589,605 | S | 3/2009 | Reedy |
| 7,503,616 | B2 | 3/2009 | Linhard |
| 7,515,719 | B2 | 4/2009 | Hooley |
| 7,536,769 | B2 | 5/2009 | Pedersen |
| D595,402 | S | 6/2009 | Miyake |
| D595,736 | S | 7/2009 | Son |
| 7,558,381 | B1 | 7/2009 | Ali |
| 7,561,700 | B1 | 7/2009 | Bernardi |
| 7,565,949 | B2 | 7/2009 | Tojo |
| D601,585 | S | 10/2009 | Andre |
| 7,651,390 | B1 | 1/2010 | Profeta |
| 7,660,428 | B2 | 2/2010 | Rodman |
| 7,667,728 | B2 | 2/2010 | Kenoyer |
| 7,672,445 | B1 | 3/2010 | Zhang |
| D613,338 | S | 4/2010 | Marukos |
| 7,701,110 | B2 | 4/2010 | Fukuda |
| 7,702,116 | B2 | 4/2010 | Stone |
| D614,871 | S | 5/2010 | Tang |
| 7,724,891 | B2 | 5/2010 | Beaucoup |
| D617,441 | S | 6/2010 | Koury |
| 7,747,001 | B2 | 6/2010 | Kellermann |
| 7,756,278 | B2 | 7/2010 | Moorer |
| 7,783,063 | B2 | 8/2010 | Pocino |
| 7,787,328 | B2 | 8/2010 | Chu |
| 7,830,862 | B2 | 11/2010 | James |
| 7,831,035 | B2 | 11/2010 | Stokes |
| 7,831,036 | B2 | 11/2010 | Beaucoup |
| 7,856,097 | B2 | 12/2010 | Tokuda |

(56) References Cited

U.S. PATENT DOCUMENTS

| | | | | |
|---|---|---|---|---|
| 7,881,486 | B1 | 2/2011 | Killion | |
| 7,894,421 | B2 | 2/2011 | Kwan | |
| D636,188 | S | 4/2011 | Kim | |
| 7,925,006 | B2 | 4/2011 | Hirai | |
| 7,925,007 | B2 | 4/2011 | Stokes | |
| 7,936,886 | B2 | 5/2011 | Kim | |
| 7,970,123 | B2 | 6/2011 | Beaucoup | |
| 7,970,151 | B2 | 6/2011 | Oxford | |
| D642,385 | S | 8/2011 | Lee | |
| D643,015 | S | 8/2011 | Kim | |
| 7,991,167 | B2 | 8/2011 | Oxford | |
| 7,995,768 | B2 | 8/2011 | Miki | |
| 8,000,481 | B2 | 8/2011 | Nishikawa | |
| 8,005,238 | B2 | 8/2011 | Tashev | |
| 8,019,091 | B2 | 9/2011 | Burnett | |
| 8,041,054 | B2 | 10/2011 | Yeldener | |
| 8,059,843 | B2 | 11/2011 | Hung | |
| 8,064,629 | B2 | 11/2011 | Jiang | |
| 8,085,947 | B2 | 12/2011 | Haulick | |
| 8,085,949 | B2 | 12/2011 | Kim | |
| 8,095,120 | B1 | 1/2012 | Blair | |
| 8,098,842 | B2 | 1/2012 | Florencio | |
| 8,098,844 | B2 | 1/2012 | Elko | |
| 8,103,030 | B2 | 1/2012 | Barthel | |
| 8,109,360 | B2 | 2/2012 | Stewart, Jr. | |
| 8,112,272 | B2 | 2/2012 | Nagahama | |
| 8,116,500 | B2 | 2/2012 | Oxford | |
| 8,121,834 | B2 | 2/2012 | Rosec | |
| D655,271 | S | 3/2012 | Park | |
| D656,473 | S | 3/2012 | Laube | |
| 8,130,969 | B2 | 3/2012 | Buck | |
| 8,130,977 | B2 | 3/2012 | Chu | |
| 8,135,143 | B2 | 3/2012 | Ishibashi | |
| 8,144,886 | B2 | 3/2012 | Ishibashi | |
| D658,153 | S | 4/2012 | Woo | |
| 8,155,331 | B2 | 4/2012 | Nakadai | |
| 8,170,882 | B2 | 5/2012 | Davis | |
| 8,175,291 | B2 | 5/2012 | Chan | |
| 8,175,871 | B2 | 5/2012 | Wang | |
| 8,184,801 | B1 | 5/2012 | Hamalainen | |
| 8,189,765 | B2 | 5/2012 | Nishikawa | |
| 8,189,810 | B2 | 5/2012 | Wolff | |
| 8,194,863 | B2 | 6/2012 | Takumai | |
| 8,199,927 | B1 | 6/2012 | Raftery | |
| 8,204,198 | B2 | 6/2012 | Adeney | |
| 8,204,248 | B2 | 6/2012 | Haulick | |
| 8,208,664 | B2 | 6/2012 | Iwasaki | |
| 8,213,596 | B2 | 7/2012 | Beaucoup | |
| 8,213,634 | B1 | 7/2012 | Daniel | |
| 8,219,387 | B2 | 7/2012 | Cutler | |
| 8,229,134 | B2 | 7/2012 | Duraiswami | |
| 8,233,352 | B2 | 7/2012 | Beaucoup | |
| 8,243,951 | B2 | 8/2012 | Ishibashi | |
| 8,244,536 | B2 | 8/2012 | Arun | |
| 8,249,273 | B2 | 8/2012 | Inoda | |
| 8,259,959 | B2 | 9/2012 | Marton | |
| 8,275,120 | B2 | 9/2012 | Stokes, III | |
| 8,280,728 | B2 | 10/2012 | Chen | |
| 8,284,949 | B2 | 10/2012 | Farhang | |
| 8,284,952 | B2 | 10/2012 | Reining | |
| 8,286,749 | B2 | 10/2012 | Stewart | |
| 8,290,142 | B1 | 10/2012 | Lambert | |
| 8,291,670 | B2 | 10/2012 | Gard | |
| 8,297,402 | B2 | 10/2012 | Stewart | |
| 8,315,380 | B2 | 11/2012 | Liu | |
| 8,331,582 | B2 | 12/2012 | Steele | |
| 8,345,898 | B2 | 1/2013 | Reining | |
| 8,355,521 | B2 | 1/2013 | Larson | |
| 8,370,140 | B2 | 2/2013 | Vitte | |
| 8,379,823 | B2 | 2/2013 | Ratmanski | |
| 8,385,557 | B2 | 2/2013 | Tashev | |
| D678,329 | S | 3/2013 | Lee | |
| 8,395,653 | B2 | 3/2013 | Feng | |
| 8,403,107 | B2 | 3/2013 | Stewart | |
| 8,406,436 | B2 | 3/2013 | Craven | |
| 8,428,661 | B2 | 4/2013 | Chen | |
| 8,433,061 | B2 | 4/2013 | Cutler | |
| D682,266 | S | 5/2013 | Wu | |
| 8,437,490 | B2 | 5/2013 | Marton | |
| 8,443,930 | B2 | 5/2013 | Stewart, Jr. | |
| 8,447,590 | B2 | 5/2013 | Ishibashi | |
| 8,472,639 | B2 | 6/2013 | Reining | |
| 8,472,640 | B2 | 6/2013 | Marton | |
| D685,346 | S | 7/2013 | Szymanski | |
| D686,182 | S | 7/2013 | Ashiwa | |
| 8,479,871 | B2 | 7/2013 | Stewart | |
| 8,483,398 | B2 | 7/2013 | Fozunbal | |
| 8,498,423 | B2 | 7/2013 | Thaden | |
| D687,432 | S | 8/2013 | Duan | |
| 8,503,653 | B2 | 8/2013 | Ahuja | |
| 8,515,089 | B2 | 8/2013 | Nicholson | |
| 8,515,109 | B2 | 8/2013 | Dittberner | |
| 8,526,633 | B2 | 9/2013 | Ukai | |
| 8,553,904 | B2 | 10/2013 | Said | |
| 8,559,611 | B2 | 10/2013 | Ratmanski | |
| D693,328 | S | 11/2013 | Goetzen | |
| 8,583,481 | B2 | 11/2013 | Walter | |
| 8,599,194 | B2 | 12/2013 | Lewis | |
| 8,600,443 | B2 | 12/2013 | Kawaguchi | |
| 8,605,890 | B2 | 12/2013 | Zhang | |
| 8,620,650 | B2 | 12/2013 | Walters | |
| 8,630,431 | B2 | 1/2014 | Gran | |
| 8,631,897 | B2 | 1/2014 | Stewart | |
| 8,634,569 | B2 | 1/2014 | Lu | |
| 8,638,951 | B2 | 1/2014 | Zurek | |
| D699,712 | S | 2/2014 | Bourne | |
| 8,644,477 | B2 | 2/2014 | Gilbert | |
| 8,654,955 | B1 | 2/2014 | Lambert | |
| 8,654,990 | B2 | 2/2014 | Faller | |
| 8,660,274 | B2 | 2/2014 | Wolff | |
| 8,660,275 | B2 | 2/2014 | Buck | |
| 8,670,581 | B2 | 3/2014 | Harman | |
| 8,672,087 | B2 | 3/2014 | Stewart | |
| 8,675,890 | B2 | 3/2014 | Schmidt | |
| 8,675,899 | B2 | 3/2014 | Jung | |
| 8,676,728 | B1 | 3/2014 | Velusamy | |
| 8,682,675 | B2 | 3/2014 | Togami | |
| 8,724,829 | B2 | 5/2014 | Visser | |
| 8,730,156 | B2 | 5/2014 | Weising | |
| 8,744,069 | B2 | 6/2014 | Cutler | |
| 8,744,101 | B1 | 6/2014 | Burns | |
| 8,755,536 | B2 | 6/2014 | Chen | |
| 8,787,560 | B2 | 7/2014 | Buck | |
| 8,811,601 | B2 | 8/2014 | Mohammad | |
| 8,818,002 | B2 | 8/2014 | Tashev | |
| 8,824,693 | B2 | 9/2014 | ÅHgren | |
| 8,842,851 | B2 | 9/2014 | Beaucoup | |
| 8,855,326 | B2 | 10/2014 | Derkx | |
| 8,855,327 | B2 | 10/2014 | Tanaka | |
| 8,861,713 | B2 | 10/2014 | Xu | |
| 8,861,756 | B2 | 10/2014 | Zhu | |
| 8,873,789 | B2 | 10/2014 | Bigeh | |
| D717,272 | S | 11/2014 | Kim | |
| 8,886,343 | B2 | 11/2014 | Ishibashi | |
| 8,893,849 | B2 | 11/2014 | Hudson | |
| 8,898,633 | B2 | 11/2014 | Bryant | |
| D718,731 | S | 12/2014 | Lee | |
| 8,903,106 | B2 | 12/2014 | Meyer | |
| 8,923,529 | B2 | 12/2014 | McCowan | |
| 8,929,564 | B2 | 1/2015 | Kikkeri | |
| 8,942,382 | B2 | 1/2015 | Elko | |
| 8,965,546 | B2 | 2/2015 | Visser | |
| D725,059 | S | 3/2015 | Kim | |
| D725,631 | S | 3/2015 | McNamara | |
| 8,976,977 | B2 | 3/2015 | De Sena et al. | |
| 8,983,089 | B1 | 3/2015 | Chu | |
| 8,983,834 | B2 | 3/2015 | Davis | |
| D726,144 | S | 4/2015 | Kang | |
| D727,968 | S | 4/2015 | Onoue | |
| 9,002,028 | B2 | 4/2015 | Haulick | |
| D729,767 | S | 5/2015 | Lee | |
| 9,038,301 | B2 | 5/2015 | Zelbacher | |
| 9,071,913 | B2 * | 6/2015 | Koch | H04H 20/61 |
| 9,088,336 | B2 | 7/2015 | Mani | |

(56) References Cited

U.S. PATENT DOCUMENTS

| | | | |
|---|---|---|---|
| 9,094,496 | B2 | 7/2015 | Teutsch |
| D735,717 | S | 8/2015 | Lam |
| D737,245 | S | 8/2015 | Fan |
| 9,099,094 | B2 | 8/2015 | Burnett |
| 9,107,001 | B2 | 8/2015 | Diethorn |
| 9,111,543 | B2 | 8/2015 | ÅHgren |
| 9,113,242 | B2 | 8/2015 | Hyun |
| 9,113,247 | B2 | 8/2015 | Chatlani |
| 9,126,827 | B2 | 9/2015 | Hsieh |
| 9,129,223 | B1 | 9/2015 | Velusamy |
| 9,140,054 | B2 | 9/2015 | Oberbroeckling |
| D740,279 | S | 10/2015 | Wu |
| 9,172,345 | B2 | 10/2015 | Kok |
| D743,376 | S | 11/2015 | Kim |
| D743,939 | S | 11/2015 | Seong |
| 9,196,261 | B2 | 11/2015 | Burnett |
| 9,197,974 | B1 | 11/2015 | Clark |
| 9,203,494 | B2 | 12/2015 | Tarighat Mehrabani |
| 9,215,327 | B2 | 12/2015 | Bathurst |
| 9,215,543 | B2 | 12/2015 | Sun |
| 9,226,062 | B2 | 12/2015 | Sun |
| 9,226,070 | B2 | 12/2015 | Hyun |
| 9,226,088 | B2 | 12/2015 | Pandey |
| 9,232,185 | B2 | 1/2016 | Graham |
| 9,237,391 | B2 | 1/2016 | Benesty |
| 9,247,367 | B2 | 1/2016 | Nobile |
| 9,253,567 | B2 | 2/2016 | Morcelli |
| 9,257,132 | B2 | 2/2016 | Gowreesunker |
| 9,264,553 | B2 | 2/2016 | Pandey |
| 9,264,805 | B2 | 2/2016 | Buck |
| 9,280,985 | B2 | 3/2016 | Tawada |
| 9,286,908 | B2 | 3/2016 | Zhang |
| 9,294,839 | B2 | 3/2016 | Lambert |
| 9,301,049 | B2 | 3/2016 | Elko |
| D754,103 | S | 4/2016 | Fischer |
| 9,307,326 | B2 | 4/2016 | Elko |
| 9,319,532 | B2 | 4/2016 | Bao |
| 9,319,799 | B2 | 4/2016 | Salmon |
| 9,326,060 | B2 | 4/2016 | Nicholson |
| D756,502 | S | 5/2016 | Lee |
| 9,330,673 | B2 | 5/2016 | Cho |
| 9,338,301 | B2 | 5/2016 | Pocino |
| 9,338,549 | B2 | 5/2016 | Haulick |
| 9,354,310 | B2 | 5/2016 | Visser |
| 9,357,080 | B2 | 5/2016 | Beaucoup |
| 9,403,670 | B2 | 8/2016 | Schelling |
| 9,426,598 | B2 | 8/2016 | Walsh |
| D767,748 | S | 9/2016 | Nakai |
| 9,451,078 | B2 | 9/2016 | Yang |
| D769,239 | S | 10/2016 | Li |
| 9,462,378 | B2 | 10/2016 | Kuech |
| 9,473,868 | B2 | 10/2016 | Huang |
| 9,479,627 | B1 | 10/2016 | Rung |
| 9,479,885 | B1 | 10/2016 | Ivanov |
| 9,489,948 | B1 | 11/2016 | Chu |
| 9,510,090 | B2 | 11/2016 | Lissek |
| 9,514,723 | B2 | 12/2016 | Silfvast |
| 9,516,412 | B2 | 12/2016 | Shigenaga |
| 9,521,057 | B2 | 12/2016 | Klingbeil |
| 9,549,245 | B2 | 1/2017 | Frater |
| 9,560,446 | B1 | 1/2017 | Chang |
| 9,560,451 | B2 | 1/2017 | Eichfeld |
| 9,565,493 | B2 | 2/2017 | Abraham |
| 9,565,507 | B2 | 2/2017 | Case |
| 9,578,413 | B2 | 2/2017 | Sawa |
| 9,578,440 | B2 | 2/2017 | Otto |
| 9,589,556 | B2 | 3/2017 | Gao |
| 9,591,123 | B2 | 3/2017 | Sorensen |
| 9,591,404 | B1 | 3/2017 | Chhetri |
| D784,299 | S | 4/2017 | Cho |
| 9,615,173 | B2 | 4/2017 | Sako |
| 9,628,596 | B1 | 4/2017 | Bullough |
| 9,635,186 | B2 | 4/2017 | Pandey |
| 9,635,474 | B2 | 4/2017 | Kuster |
| D787,481 | S | 5/2017 | Tyss |
| D788,073 | S | 5/2017 | Silvera |
| 9,640,187 | B2 | 5/2017 | Niemisto |
| 9,641,688 | B2 | 5/2017 | Pandey |
| 9,641,929 | B2 | 5/2017 | Li |
| 9,641,935 | B1 | 5/2017 | Ivanov |
| 9,653,091 | B2 | 5/2017 | Matsuo |
| 9,653,092 | B2 | 5/2017 | Sun |
| 9,655,001 | B2 | 5/2017 | Metzger |
| 9,659,576 | B1 | 5/2017 | Kotvis |
| D789,323 | S | 6/2017 | Mackiewicz |
| 9,674,604 | B2 | 6/2017 | Deroo |
| 9,692,882 | B2 | 6/2017 | Mani |
| 9,706,057 | B2 | 7/2017 | Mani |
| 9,716,944 | B2 | 7/2017 | Yliaho |
| 9,721,582 | B1 | 8/2017 | Huang |
| 9,734,835 | B2 | 8/2017 | Fujieda |
| 9,754,572 | B2 | 9/2017 | Salazar |
| 9,761,243 | B2 | 9/2017 | Taenzer |
| D801,285 | S | 10/2017 | Timmins |
| 9,788,119 | B2 | 10/2017 | Vilermo |
| 9,813,806 | B2 | 11/2017 | Graham |
| 9,818,426 | B2 | 11/2017 | Kotera |
| 9,826,211 | B2 | 11/2017 | Sawa |
| 9,854,101 | B2 | 12/2017 | Pandey |
| 9,854,363 | B2 | 12/2017 | Sladeczek |
| 9,860,439 | B2 | 1/2018 | Sawa |
| 9,866,952 | B2 | 1/2018 | Pandey |
| D811,393 | S | 2/2018 | Ahn |
| 9,894,434 | B2 | 2/2018 | Rollow, IV |
| 9,930,448 | B1 | 3/2018 | Chen |
| 9,936,290 | B2 | 4/2018 | Mohammad |
| 9,966,059 | B1 | 5/2018 | Ayrapetian |
| 9,973,848 | B2 | 5/2018 | Chhetri |
| 9,980,042 | B1 | 5/2018 | Benattar |
| D819,607 | S | 6/2018 | Chui |
| D819,631 | S | 6/2018 | Matsumiya |
| 10,015,589 | B1 | 7/2018 | Ebenezer |
| 10,021,506 | B2 | 7/2018 | Johnson |
| 10,021,515 | B1 | 7/2018 | Mallya |
| 10,034,116 | B2 | 7/2018 | Kadri |
| 10,038,769 | B2 | 7/2018 | Ukai |
| 10,054,320 | B2 | 8/2018 | Choi |
| 10,061,009 | B1 | 8/2018 | Family |
| 10,062,379 | B2 | 8/2018 | Katuri |
| 10,153,744 | B1 | 12/2018 | Every |
| 10,165,386 | B2 | 12/2018 | Lehtiniemi |
| D841,589 | S | 2/2019 | Böhmer |
| 10,206,030 | B2 | 2/2019 | Matsumoto |
| 10,210,882 | B1 | 2/2019 | McCowan |
| 10,231,062 | B2 | 3/2019 | Pedersen |
| 10,244,121 | B2 | 3/2019 | Mani |
| 10,244,219 | B2 | 3/2019 | Sawa |
| 10,269,343 | B2 | 4/2019 | Wingate |
| 10,366,702 | B2 | 7/2019 | Morton |
| 10,367,948 | B2 | 7/2019 | Wells-Rutherford |
| D857,873 | S | 8/2019 | Shimada |
| 10,389,861 | B2 | 8/2019 | Mani |
| 10,389,885 | B2 | 8/2019 | Sun |
| D860,319 | S | 9/2019 | Beruto |
| D860,997 | S | 9/2019 | Jhun |
| D864,136 | S | 10/2019 | Kim |
| 10,440,469 | B2 | 10/2019 | Barnett |
| D865,723 | S | 11/2019 | Cho |
| 10,566,008 | B2 | 2/2020 | Thorpe |
| 10,602,267 | B2 | 3/2020 | Grosche |
| D883,952 | S | 5/2020 | Lucas |
| 10,650,797 | B2 | 5/2020 | Kumar |
| D888,020 | S | 6/2020 | Lyu |
| 10,728,653 | B2 | 7/2020 | Graham |
| D900,070 | S | 10/2020 | Lantz |
| D900,071 | S | 10/2020 | Lantz |
| D900,072 | S | 10/2020 | Lantz |
| D900,073 | S | 10/2020 | Lantz |
| D900,074 | S | 10/2020 | Lantz |
| 10,827,263 | B2 | 11/2020 | Christoph |
| 10,863,270 | B1 | 12/2020 | Cornelius |
| 10,930,297 | B2 | 2/2021 | Christoph |
| 10,959,018 | B1 | 3/2021 | Shi |
| 10,979,805 | B2 | 4/2021 | Chowdhary |

(56) References Cited

U.S. PATENT DOCUMENTS

| | | | |
|---|---|---|---|
| D924,189 | S | 7/2021 | Park |
| 11,109,133 | B2 | 8/2021 | Lantz |
| D940,116 | S | 1/2022 | Cho |
| 11,218,802 | B1 | 1/2022 | Kandadai |
| 11,310,592 | B2 | 4/2022 | Abraham |
| 11,564,049 | B2 * | 1/2023 | Tossing .................. H04R 27/00 |
| 11,871,176 | B2 * | 1/2024 | Zheng .................... H04R 3/005 |
| 11,985,461 | B2 * | 5/2024 | Sato ......................... H04R 1/08 |
| 2001/0031058 | A1 | 10/2001 | Anderson |
| 2002/0015500 | A1 | 2/2002 | Belt |
| 2002/0041679 | A1 | 4/2002 | Beaucoup |
| 2002/0048377 | A1 | 4/2002 | Vaudrey |
| 2002/0064158 | A1 | 5/2002 | Yokoyama |
| 2002/0064287 | A1 | 5/2002 | Kawamura |
| 2002/0069054 | A1 | 6/2002 | Arrowood |
| 2002/0110255 | A1 | 8/2002 | Killion |
| 2002/0126861 | A1 | 9/2002 | Colby |
| 2002/0131580 | A1 | 9/2002 | Smith |
| 2002/0140633 | A1 | 10/2002 | Rafii |
| 2002/0146282 | A1 | 10/2002 | Wilkes |
| 2002/0149070 | A1 | 10/2002 | Sheplak |
| 2002/0159603 | A1 | 10/2002 | Hirai |
| 2003/0026437 | A1 | 2/2003 | Janse |
| 2003/0053639 | A1 | 3/2003 | Beaucoup |
| 2003/0059061 | A1 | 3/2003 | Tsuji |
| 2003/0063762 | A1 | 4/2003 | Tajima |
| 2003/0063768 | A1 | 4/2003 | Cornelius |
| 2003/0072461 | A1 | 4/2003 | Moorer |
| 2003/0107478 | A1 | 6/2003 | Hendricks |
| 2003/0118200 | A1 | 6/2003 | Beaucoup |
| 2003/0122777 | A1 | 7/2003 | Grover |
| 2003/0138119 | A1 | 7/2003 | Pocino |
| 2003/0156725 | A1 | 8/2003 | Boone |
| 2003/0161485 | A1 | 8/2003 | Smith |
| 2003/0163326 | A1 | 8/2003 | Maase |
| 2003/0169888 | A1 | 9/2003 | Subotic |
| 2003/0185404 | A1 | 10/2003 | Milsap |
| 2003/0198339 | A1 | 10/2003 | Roy |
| 2003/0198359 | A1 | 10/2003 | Killion |
| 2003/0202107 | A1 | 10/2003 | Slattery |
| 2004/0013038 | A1 | 1/2004 | Kajala |
| 2004/0013252 | A1 | 1/2004 | Craner |
| 2004/0076305 | A1 | 4/2004 | Santiago |
| 2004/0105557 | A1 | 6/2004 | Matsuo |
| 2004/0125942 | A1 | 7/2004 | Beaucoup |
| 2004/0175006 | A1 | 9/2004 | Kim |
| 2004/0202345 | A1 | 10/2004 | Stenberg |
| 2004/0240664 | A1 | 12/2004 | Freed |
| 2005/0005494 | A1 | 1/2005 | Way |
| 2005/0041530 | A1 | 2/2005 | Goudie |
| 2005/0069156 | A1 | 3/2005 | Haapapuro |
| 2005/0094580 | A1 | 5/2005 | Kumar |
| 2005/0094795 | A1 | 5/2005 | Rambo |
| 2005/0149320 | A1 | 7/2005 | Kajala |
| 2005/0157897 | A1 | 7/2005 | Saltykov |
| 2005/0175189 | A1 | 8/2005 | Lee |
| 2005/0175190 | A1 | 8/2005 | Tashev |
| 2005/0213747 | A1 | 9/2005 | Popovich |
| 2005/0221867 | A1 | 10/2005 | Zurek |
| 2005/0238196 | A1 | 10/2005 | Furuno |
| 2005/0270906 | A1 | 12/2005 | Ramenzoni |
| 2005/0271221 | A1 | 12/2005 | Cerwin |
| 2005/0286698 | A1 | 12/2005 | Bathurst |
| 2005/0286729 | A1 | 12/2005 | Harwood |
| 2006/0083390 | A1 | 4/2006 | Kaderavek |
| 2006/0088173 | A1 | 4/2006 | Rodman |
| 2006/0093128 | A1 | 5/2006 | Oxford |
| 2006/0098403 | A1 | 5/2006 | Smith |
| 2006/0104458 | A1 | 5/2006 | Kenoyer |
| 2006/0109983 | A1 | 5/2006 | Young |
| 2006/0151256 | A1 | 7/2006 | Lee |
| 2006/0159293 | A1 | 7/2006 | Azima |
| 2006/0161430 | A1 | 7/2006 | Schweng |
| 2006/0165242 | A1 | 7/2006 | Miki |
| 2006/0192976 | A1 | 8/2006 | Hall |
| 2006/0198541 | A1 | 9/2006 | Henry |
| 2006/0204022 | A1 | 9/2006 | Hooley |
| 2006/0215866 | A1 | 9/2006 | Francisco |
| 2006/0222187 | A1 | 10/2006 | Jarrett |
| 2006/0233353 | A1 | 10/2006 | Beaucoup |
| 2006/0239471 | A1 | 10/2006 | Mao |
| 2006/0262942 | A1 | 11/2006 | Oxford |
| 2006/0269080 | A1 | 11/2006 | Oxford |
| 2006/0269086 | A1 | 11/2006 | Page |
| 2007/0006474 | A1 | 1/2007 | Taniguchi |
| 2007/0009116 | A1 | 1/2007 | Reining |
| 2007/0019828 | A1 | 1/2007 | Hughes |
| 2007/0053524 | A1 | 3/2007 | Haulick |
| 2007/0093714 | A1 | 4/2007 | Beaucoup |
| 2007/0116255 | A1 | 5/2007 | Derkx |
| 2007/0120029 | A1 | 5/2007 | Keung |
| 2007/0165871 | A1 | 7/2007 | Roovers |
| 2007/0230712 | A1 | 10/2007 | Belt |
| 2007/0253561 | A1 | 11/2007 | Williams |
| 2007/0269066 | A1 | 11/2007 | Derleth |
| 2008/0008339 | A1 | 1/2008 | Ryan |
| 2008/0033723 | A1 | 2/2008 | Jang |
| 2008/0046235 | A1 | 2/2008 | Chen |
| 2008/0056517 | A1 | 3/2008 | Algazi |
| 2008/0101622 | A1 | 5/2008 | Sugiyama |
| 2008/0130907 | A1 | 6/2008 | Sudo |
| 2008/0144848 | A1 | 6/2008 | Buck |
| 2008/0152167 | A1 | 6/2008 | Taenzer |
| 2008/0168283 | A1 | 7/2008 | Penning |
| 2008/0175375 | A1 | 7/2008 | Ishiguro |
| 2008/0188965 | A1 | 8/2008 | Bruey |
| 2008/0212805 | A1 | 9/2008 | Fincham |
| 2008/0232607 | A1 | 9/2008 | Tashev |
| 2008/0247567 | A1 | 10/2008 | Kjolerbakken |
| 2008/0253553 | A1 | 10/2008 | Li |
| 2008/0253589 | A1 | 10/2008 | Trahms |
| 2008/0259731 | A1 | 10/2008 | Happonen |
| 2008/0260175 | A1 | 10/2008 | Elko |
| 2008/0267422 | A1 | 10/2008 | Cox |
| 2008/0279400 | A1 | 11/2008 | Knoll |
| 2008/0285772 | A1 | 11/2008 | Haulick |
| 2009/0003586 | A1 | 1/2009 | Lai |
| 2009/0003626 | A1 | 1/2009 | Burnett |
| 2009/0030536 | A1 | 1/2009 | Gur |
| 2009/0052684 | A1 | 2/2009 | Ishibashi |
| 2009/0052686 | A1 | 2/2009 | Wu |
| 2009/0052715 | A1 | 2/2009 | Zhang |
| 2009/0086998 | A1 | 4/2009 | Jeong |
| 2009/0087000 | A1 | 4/2009 | Ko |
| 2009/0087001 | A1 | 4/2009 | Jiang |
| 2009/0094817 | A1 | 4/2009 | Killion |
| 2009/0129609 | A1 | 5/2009 | Oh |
| 2009/0147967 | A1 | 6/2009 | Ishibashi |
| 2009/0150149 | A1 | 6/2009 | Cutter |
| 2009/0161880 | A1 | 6/2009 | Hooley |
| 2009/0169027 | A1 | 7/2009 | Ura |
| 2009/0173030 | A1 | 7/2009 | Gulbrandsen |
| 2009/0173570 | A1 | 7/2009 | Levit |
| 2009/0226004 | A1 | 9/2009 | Moeller |
| 2009/0233545 | A1 | 9/2009 | Sutskover |
| 2009/0237561 | A1 | 9/2009 | Kobayashi |
| 2009/0254340 | A1 | 10/2009 | Sun |
| 2009/0274318 | A1 | 11/2009 | Ishibashi |
| 2009/0287482 | A1 | 11/2009 | Hetherington |
| 2009/0310794 | A1 | 12/2009 | Ishibashi |
| 2010/0011644 | A1 | 1/2010 | Kramer |
| 2010/0034397 | A1 | 2/2010 | Nakadai |
| 2010/0074433 | A1 | 3/2010 | Zhang |
| 2010/0111323 | A1 | 5/2010 | Marton |
| 2010/0111324 | A1 | 5/2010 | Yeldener |
| 2010/0119097 | A1 | 5/2010 | Ohtsuka |
| 2010/0123785 | A1 | 5/2010 | Chen |
| 2010/0128892 | A1 | 5/2010 | Chen |
| 2010/0128901 | A1 | 5/2010 | Herman |
| 2010/0131749 | A1 | 5/2010 | Kim |
| 2010/0142721 | A1 | 6/2010 | Wada |
| 2010/0150364 | A1 | 6/2010 | Buck |
| 2010/0158268 | A1 | 6/2010 | Marton |
| 2010/0165071 | A1 | 7/2010 | Ishibashi |

(56) References Cited

U.S. PATENT DOCUMENTS

2010/0166219 A1 7/2010 Marton
2010/0189275 A1 7/2010 Christoph
2010/0189299 A1 7/2010 Grant
2010/0202628 A1 8/2010 Meyer
2010/0208605 A1 8/2010 Wang
2010/0215184 A1 8/2010 Buck
2010/0215189 A1 8/2010 Marton
2010/0217590 A1 8/2010 Nemer
2010/0245624 A1 9/2010 Beaucoup
2010/0246873 A1 9/2010 Chen
2010/0284185 A1 11/2010 Ngai
2010/0305728 A1 12/2010 Aiso
2010/0314513 A1 12/2010 Evans
2010/0329478 A1 12/2010 Kubin
2011/0002469 A1 1/2011 Ojala
2011/0007921 A1 1/2011 Stewart
2011/0033063 A1 2/2011 McGrath
2011/0038229 A1 2/2011 Beaucoup
2011/0096136 A1 4/2011 Liu
2011/0096631 A1 4/2011 Kondo
2011/0096915 A1 4/2011 Nemer
2011/0164761 A1 7/2011 McCowan
2011/0194719 A1 8/2011 Frater
2011/0211706 A1 9/2011 Tanaka
2011/0235821 A1 9/2011 Okita
2011/0268287 A1 11/2011 Ishibashi
2011/0311064 A1 12/2011 Teutsch
2011/0311085 A1 12/2011 Stewart
2011/0317862 A1 12/2011 Hosoe
2012/0002835 A1 1/2012 Stewart
2012/0014049 A1 1/2012 Ogle
2012/0027227 A1 2/2012 Kok
2012/0070015 A1 3/2012 Oh
2012/0076316 A1 3/2012 Zhu
2012/0080260 A1 4/2012 Stewart
2012/0093344 A1 4/2012 Sun
2012/0106755 A1 5/2012 Zhang
2012/0117474 A1 5/2012 Miki
2012/0128160 A1 5/2012 Kim
2012/0128166 A1 5/2012 Kim
2012/0128175 A1 5/2012 Erik
2012/0155688 A1 6/2012 Wilson
2012/0155703 A1 6/2012 Hernandez-Abrego
2012/0163625 A1 6/2012 Siotis
2012/0169826 A1 7/2012 Jeong
2012/0177219 A1 7/2012 Mullen
2012/0182429 A1 7/2012 Forutanpour
2012/0207335 A1 8/2012 Spaanderman
2012/0224709 A1 9/2012 Keddem
2012/0230511 A1 9/2012 Burnett
2012/0243698 A1 9/2012 Elko
2012/0262536 A1 10/2012 Chen
2012/0263019 A1 10/2012 Armstong-Muntner
2012/0288079 A1 11/2012 Burnett
2012/0288114 A1 11/2012 Duraiswami
2012/0294472 A1 11/2012 Hudson
2012/0327115 A1 12/2012 Chhetri
2012/0328142 A1 12/2012 Horibe
2013/0002797 A1 1/2013 Thapa
2013/0004013 A1 1/2013 Stewart
2013/0015014 A1 1/2013 Stewart
2013/0016847 A1 1/2013 Steiner
2013/0028451 A1 1/2013 De Roo
2013/0029684 A1 1/2013 Kawaguchi
2013/0034241 A1 2/2013 Pandey
2013/0039504 A1 2/2013 Pandey
2013/0083911 A1 4/2013 Bathurst
2013/0094689 A1 4/2013 Tanaka
2013/0101136 A1 4/2013 McElveen
2013/0101141 A1 4/2013 McElveen
2013/0136274 A1 5/2013 ÅHgren
2013/0142343 A1 6/2013 Matsui
2013/0147835 A1 6/2013 Lee
2013/0156198 A1 6/2013 Kim
2013/0182190 A1 7/2013 McCartney
2013/0206501 A1 8/2013 Yu
2013/0216066 A1 8/2013 Yerrace
2013/0226593 A1 8/2013 Magnusson
2013/0251181 A1 9/2013 Stewart
2013/0264144 A1 10/2013 Hudson
2013/0271559 A1 10/2013 Feng
2013/0282372 A1 10/2013 Erik
2013/0294616 A1 11/2013 Mulder
2013/0297302 A1 11/2013 Pan
2013/0304476 A1 11/2013 Kim
2013/0304479 A1 11/2013 Teller
2013/0329908 A1 12/2013 Lindahl
2013/0332156 A1 12/2013 Tackin
2013/0336516 A1 12/2013 Stewart
2013/0343549 A1 12/2013 Vemireddy
2014/0003635 A1 1/2014 Mohammad
2014/0010383 A1 1/2014 Mackey
2014/0016794 A1 1/2014 Lu
2014/0029761 A1 1/2014 Maenpaa
2014/0037097 A1 2/2014 Mark
2014/0050332 A1 2/2014 Nielsen
2014/0072151 A1 3/2014 Ochs
2014/0098233 A1 4/2014 Martin
2014/0098964 A1 4/2014 Rosca
2014/0122060 A1 5/2014 Kaszczuk
2014/0126746 A1 5/2014 Shin
2014/0177857 A1 6/2014 Kuster
2014/0233777 A1 8/2014 Tseng
2014/0233778 A1 8/2014 Hardiman
2014/0264654 A1 9/2014 Salmon
2014/0265774 A1 9/2014 Stewart
2014/0270271 A1 9/2014 Dehe
2014/0286518 A1 9/2014 Stewart
2014/0294211 A1 10/2014 Schneider
2014/0295768 A1 10/2014 Wu
2014/0301586 A1 10/2014 Stewart
2014/0307882 A1 10/2014 Leblanc
2014/0314251 A1 10/2014 Rosca
2014/0341392 A1 11/2014 Lambert
2014/0357177 A1 12/2014 Stewart
2014/0363008 A1 12/2014 Chen
2015/0003638 A1 1/2015 Kasai
2015/0024799 A1 1/2015 Swanson
2015/0025878 A1 1/2015 Gowreesunker
2015/0030172 A1 1/2015 Gaensler
2015/0033042 A1 1/2015 Iwamoto
2015/0050967 A1 2/2015 Bao
2015/0055796 A1 2/2015 Nugent
2015/0055797 A1 2/2015 Nguyen
2015/0063579 A1 3/2015 Bao
2015/0070188 A1 3/2015 Aramburu
2015/0078581 A1 3/2015 Etter
2015/0078582 A1 3/2015 Graham
2015/0097719 A1 4/2015 Balachandreswaran
2015/0104023 A1 4/2015 Bilobrov
2015/0117672 A1 4/2015 Christoph
2015/0118960 A1 4/2015 Petit
2015/0126255 A1 5/2015 Yang
2015/0156578 A1 6/2015 Alexandridis
2015/0163577 A1 6/2015 Benesty
2015/0185825 A1 7/2015 Mullins
2015/0189423 A1 7/2015 Giannuzzi
2015/0195644 A1 7/2015 Wilson
2015/0208171 A1 7/2015 Funakoshi
2015/0237424 A1 8/2015 Wilker
2015/0281832 A1 10/2015 Kishimoto
2015/0281833 A1 10/2015 Shigenaga
2015/0281834 A1 10/2015 Takano
2015/0312662 A1 10/2015 Kishimoto
2015/0312691 A1 10/2015 Virolainen
2015/0326968 A1 11/2015 Shigenaga
2015/0341734 A1 11/2015 Sherman
2015/0350621 A1 12/2015 Sawa
2015/0358734 A1 12/2015 Butler
2016/0011851 A1 1/2016 Zhang
2016/0021478 A1 1/2016 Katagiri
2016/0029120 A1 1/2016 Nesta
2016/0031700 A1 2/2016 Sparks
2016/0037277 A1 2/2016 Matsumoto

(56) References Cited

U.S. PATENT DOCUMENTS

2016/0055859 A1 2/2016 Finlow-Bates
2016/0080867 A1 3/2016 Nugent
2016/0088392 A1 3/2016 Huttunen
2016/0100092 A1 4/2016 Bohac
2016/0105473 A1 4/2016 Klingbeil
2016/0111109 A1 4/2016 Tsujikawa
2016/0127527 A1 5/2016 Mani
2016/0134928 A1 5/2016 Ogle
2016/0142548 A1 5/2016 Pandey
2016/0142814 A1 5/2016 Deroo
2016/0142815 A1 5/2016 Norris
2016/0148057 A1 5/2016 Oh
2016/0150315 A1 5/2016 Tzirkel-Hancock
2016/0150316 A1 5/2016 Kubota
2016/0155455 A1 6/2016 Ojanperä
2016/0161588 A1 6/2016 Benattar
2016/0165339 A1 6/2016 Benattar
2016/0165340 A1 6/2016 Benattar
2016/0165341 A1 6/2016 Benattar
2016/0173976 A1 6/2016 Podhradsky
2016/0173978 A1 6/2016 Li
2016/0189727 A1 6/2016 Wu
2016/0192068 A1 6/2016 Ng
2016/0196836 A1 7/2016 Yu
2016/0234593 A1 8/2016 Matsumoto
2016/0245698 A1 8/2016 Pau
2016/0249132 A1 8/2016 Oliaei
2016/0275961 A1 9/2016 Yu
2016/0295279 A1 10/2016 Srinivasan
2016/0300584 A1 10/2016 Pandey
2016/0302002 A1 10/2016 Lambert
2016/0302006 A1 10/2016 Pandey
2016/0323667 A1 11/2016 Shumard
2016/0323668 A1 11/2016 Abraham
2016/0330545 A1 11/2016 McElveen
2016/0337523 A1 11/2016 Pandey
2016/0353200 A1 12/2016 Bigeh
2016/0357508 A1 12/2016 Moore
2017/0019744 A1 1/2017 Matsumoto
2017/0064451 A1 3/2017 Park
2017/0105066 A1 4/2017 McLaughlin
2017/0134849 A1 5/2017 Pandey
2017/0134850 A1 5/2017 Graham
2017/0164101 A1 6/2017 Rollow, IV
2017/0180861 A1 6/2017 Chen
2017/0206064 A1 7/2017 Breazeal
2017/0230748 A1 8/2017 Shumard
2017/0264999 A1 9/2017 Fukuda
2017/0303887 A1 10/2017 Richmond
2017/0308352 A1 10/2017 Kessler
2017/0374454 A1 12/2017 Bernardini
2018/0083848 A1 3/2018 Siddiqi
2018/0102135 A1 4/2018 Ebenezer
2018/0102136 A1 4/2018 Ebenezer
2018/0109873 A1 4/2018 Xiang
2018/0115799 A1 4/2018 Thiele
2018/0160224 A1 6/2018 Graham
2018/0196585 A1 7/2018 Densham
2018/0219922 A1 8/2018 Bryans
2018/0227666 A1 8/2018 Barnett
2018/0292079 A1 10/2018 Branham
2018/0310096 A1 10/2018 Shumard
2018/0313558 A1 11/2018 Byers
2018/0338205 A1 11/2018 Abraham
2018/0359565 A1 12/2018 Kim
2019/0042187 A1 2/2019 Truong
2019/0124462 A1 4/2019 Lindahl
2019/0166424 A1 5/2019 Harney
2019/0182607 A1 6/2019 Pedersen
2019/0215540 A1 7/2019 Nicol
2019/0230436 A1 7/2019 Tsingos
2019/0259408 A1 8/2019 Freeman
2019/0268683 A1 8/2019 Miyahara
2019/0295540 A1 9/2019 Grima
2019/0295569 A1 9/2019 Wang
2019/0297422 A1 9/2019 Anderson
2019/0297542 A1 9/2019 Tang
2019/0319677 A1 10/2019 Hansen
2019/0371354 A1* 12/2019 Lester ................ G10L 21/0224
2019/0373362 A1 12/2019 Ansai
2019/0385629 A1 12/2019 Moravy
2019/0387311 A1 12/2019 Schultz
2020/0015021 A1 1/2020 Leppanen
2020/0021910 A1 1/2020 Rollow, IV
2020/0027472 A1 1/2020 Huang
2020/0037068 A1 1/2020 Barnett
2020/0068297 A1 2/2020 Rollow, IV
2020/0100009 A1 3/2020 Lantz
2020/0100025 A1 3/2020 Shumard
2020/0107137 A1 4/2020 Koutrouli
2020/0137485 A1 4/2020 Yamakawa
2020/0145753 A1 5/2020 Rollow, IV
2020/0152218 A1 5/2020 Kikuhara
2020/0162618 A1 5/2020 Enteshari
2020/0228663 A1 7/2020 Wells-Rutherford
2020/0251119 A1 8/2020 Yang
2020/0275204 A1 8/2020 Labosco
2020/0278043 A1 9/2020 Cao
2020/0288237 A1 9/2020 Abraham
2021/0012789 A1 1/2021 Husain
2021/0021940 A1 1/2021 Petersen
2021/0044881 A1 2/2021 Lantz
2021/0051397 A1 2/2021 Veselinovic
2021/0098014 A1 4/2021 Tanaka
2021/0098015 A1 4/2021 Pandey
2021/0120335 A1 4/2021 Veselinovic
2021/0200504 A1 7/2021 Park
2021/0243522 A1 8/2021 Rollow, IV
2021/0263126 A1 8/2021 Arai
2021/0375298 A1 12/2021 Zhang
2022/0369028 A1 11/2022 Abraham

FOREIGN PATENT DOCUMENTS

CA 2359771 4/2003
CA 2475283 1/2005
CA 2505496 10/2006
CA 2838856 12/2012
CA 2846323 9/2014
CN 1204425 1/1999
CN 1780495 5/2006
CN 101217830 7/2008
CN 101388213 3/2009
CN 101833954 9/2010
CN 101860776 10/2010
CN 101894558 11/2010
CN 102646418 8/2012
CN 102821336 12/2012
CN 102833664 12/2012
CN 102860039 1/2013
CN 104036784 9/2014
CN 104053088 9/2014
CN 104080289 A1 10/2014
CN 104347076 2/2015
CN 104581463 4/2015
CN 105355210 2/2016
CN 105548998 5/2016
CN 106162427 11/2016
CN 106233751 12/2016
CN 106251857 12/2016
CN 106851036 6/2017
CN 107221336 9/2017
CN 107534725 1/2018
CN 108172235 6/2018
CN 109087664 12/2018
CN 208190895 12/2018
CN 109727604 5/2019
CN 110010147 7/2019
CN 306391029 3/2021
DE 2941485 4/1981
EM 0077546430001 3/2020
EP 0381498 8/1990
EP 0594098 4/1994
EP 0869697 10/1998

(56) References Cited

FOREIGN PATENT DOCUMENTS

| | | |
|---|---|---|
| EP | 1180914 | 2/2002 |
| EP | 1184676 | 3/2002 |
| EP | 0944228 | 6/2003 |
| EP | 1439526 | 7/2004 |
| EP | 1651001 | 4/2006 |
| EP | 1727344 | 11/2006 |
| EP | 1906707 | 4/2008 |
| EP | 1952393 | 8/2008 |
| EP | 1962547 | 8/2008 |
| EP | 2133867 | 12/2009 |
| EP | 2159789 | 3/2010 |
| EP | 2197219 | 6/2010 |
| EP | 2360940 | 8/2011 |
| EP | 2710788 | 3/2014 |
| EP | 2721837 | 4/2014 |
| EP | 2772910 | 9/2014 |
| EP | 2778310 | 9/2014 |
| EP | 2942975 | 11/2015 |
| EP | 2988527 | 2/2016 |
| EP | 3035556 | 6/2016 |
| EP | 3131311 | 2/2017 |
| GB | 2393601 | 3/2004 |
| GB | 2446620 | 8/2008 |
| GB | 2512155 | 9/2014 |
| GB | 2563857 | 1/2019 |
| JP | S63144699 | 6/1988 |
| JP | H01260967 | 10/1989 |
| JP | H0241099 | 2/1990 |
| JP | H05260589 | 10/1993 |
| JP | H07336790 | 12/1995 |
| JP | 2518823 | 7/1996 |
| JP | 3175622 | 6/2001 |
| JP | 2003060530 | 2/2003 |
| JP | 2003087890 | 3/2003 |
| JP | 2004349806 | 12/2004 |
| JP | 2004537232 | 12/2004 |
| JP | 2005323084 | 11/2005 |
| JP | 2006067127 | 3/2006 |
| JP | 2006094389 | 4/2006 |
| JP | 2006101499 | 4/2006 |
| JP | 2006148330 | 6/2006 |
| JP | 4120646 | 8/2006 |
| JP | 4258472 | 8/2006 |
| JP | 4196956 | 9/2006 |
| JP | 2006340151 | 12/2006 |
| JP | 4760160 | 1/2007 |
| JP | 4752403 | 3/2007 |
| JP | 2007089058 | 4/2007 |
| JP | 4867579 | 6/2007 |
| JP | 2007208503 | 8/2007 |
| JP | 2007228069 | 9/2007 |
| JP | 2007228070 | 9/2007 |
| JP | 2007274131 | 10/2007 |
| JP | 2007274463 | 10/2007 |
| JP | 2007288679 | 11/2007 |
| JP | 2008005347 | 1/2008 |
| JP | 2008042754 | 2/2008 |
| JP | 2008154056 | 7/2008 |
| JP | 2008259022 | 10/2008 |
| JP | 2008263336 | 10/2008 |
| JP | 2008312002 | 12/2008 |
| JP | 2009206671 | 9/2009 |
| JP | 2010028653 | 2/2010 |
| JP | 2010114554 | 5/2010 |
| JP | 2010268129 | 11/2010 |
| JP | 2011015018 | 1/2011 |
| JP | 4779748 | 9/2011 |
| JP | 2012165189 | 8/2012 |
| JP | 5028944 | 9/2012 |
| JP | 5139111 | 2/2013 |
| JP | 5306565 | 10/2013 |
| JP | 5685173 | 3/2015 |
| JP | 2016051038 | 4/2016 |
| KR | 100298300 | 5/2001 |
| KR | 20040083109 | 1/2004 |
| KR | 100901464 | 6/2009 |
| KR | 100960781 | 6/2010 |
| KR | 1020130033723 | 4/2013 |
| KR | 300856915 | 5/2016 |
| TW | 201331932 | 8/2013 |
| TW | I484478 | 5/2015 |
| WO | 1997008896 | 3/1997 |
| WO | 1998047291 | 10/1998 |
| WO | 2000030402 | 5/2000 |
| WO | 2003073786 | 9/2003 |
| WO | 2003088429 | 10/2003 |
| WO | 2004027754 | 4/2004 |
| WO | 2004090865 | 10/2004 |
| WO | 2006049260 | 5/2006 |
| WO | 2006071119 | 7/2006 |
| WO | 2006114015 | 11/2006 |
| WO | 2006121896 | 11/2006 |
| WO | 2007045971 | 4/2007 |
| WO | 2007052269 | 5/2007 |
| WO | 2007090010 | 8/2007 |
| WO | 2008074249 | 6/2008 |
| WO | 2008125523 | 10/2008 |
| WO | 2009039783 | 4/2009 |
| WO | 2009109069 | 9/2009 |
| WO | 2010001508 | 1/2010 |
| WO | 2010091999 | 8/2010 |
| WO | 2010140084 | 12/2010 |
| WO | 2010144148 | 12/2010 |
| WO | 2011104501 | 9/2011 |
| WO | 2012122132 | 9/2012 |
| WO | 2012140435 | 10/2012 |
| WO | 2012158164 | 11/2012 |
| WO | 2012160459 | 11/2012 |
| WO | 2012174159 | 12/2012 |
| WO | 2013016986 | 2/2013 |
| WO | 2013182118 | 12/2013 |
| WO | 2014156292 | 10/2014 |
| WO | 2016176429 | 11/2016 |
| WO | 2016179211 | 11/2016 |
| WO | 2017208022 | 12/2017 |
| WO | 2018140444 | 8/2018 |
| WO | 2018140618 | 8/2018 |
| WO | 2018211806 | 11/2018 |
| WO | 2019231630 | 12/2019 |
| WO | 2020168873 | 8/2020 |
| WO | 2020191354 | 9/2020 |
| WO | 211843001 | 11/2020 |

OTHER PUBLICATIONS

Soda et al., Introducing Multiple Microphone Arrays for Enhancing Smart Home Voice Control, The Institute of Electronics, Information and Communication Engineers, Technical Report of IEICE, Jan. 2013, 6 pgs.

Soundweb London Application Guides, BSS Audio, 2010. 120 pgs.

Symetrix, Inc., SymNet Network Audio Solutions Brochure, 2008, 32 pgs.

Tan, et al., "Pitch Detection Algorithm: Autocorrelation Method and AMDF," Department of Computer Engineering, Prince of Songkhla University, Jan. 2003, 6 pp.

Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.

Tetelbaum et al., Design and Implementation of a Conference Phone Based on Microphone Array Technology, Proc. Global Signal Processing Conference and Expo (GSPx), Sep. 2004, 6 pgs.

Tiete et al., SoundCompass: A Distributed MEMS Microphone Array-Based Sensor for Sound Source Localization, Sensors, Jan. 23, 2014, pp. 1918-1949.

TOA Corp., Ceiling Mount Microphone AN-9001 Operating Instructions, http://www.toaelectronics.com/media/an9001_mt1e.pdf, 1 pg.

Togami, et al., "Subband Beamformer Combined with Time-Frequency ICA for Extraction of Target Source Under Reverberant Environments," 17th European Signal Processing Conference, Aug. 2009, 5 pp.

U.S. Appl. No. 16/598,918, filed Oct. 10, 2019, 50 pp.

(56) References Cited

OTHER PUBLICATIONS

Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.
Van Trees, Optimum Array Processing: Part IV of Detection, Estimation, and Modulation Theory, 2002, 54 pgs., pp. i-xxv, 90-95, 201-230.
Van Veen et al., Beamforming: A Versatile Approach to Spatial Filtering, IEEE ASSP Magazine, vol. 5, issue 2, Apr. 1988, pp. 4-24.
Vicente, "Adaptive Array Signal Processing Using the Concentric Ring Array and the Spherical Array," Ph.D. Dissertation, University of Missouri, May 2009, 226 pp.
Wang et al., Combining Superdirective Beamforming and Frequency-Domain Blind Source Separation for Highly Reverberant Signals, EURASIP Journal on Audio, Speech, and Music Processing, vol. 2010, pp. 1-13.
Warsitz, et al., "Blind Acoustic Beamforming Based on Generalized Eigenvalue Decomposition," IEEE Transactions on Audio, Speech and Language Processing, vol. 15, No. 5, 2007, 11 pp.
Weinstein, et al., "LOUD: A 1020-Node Microphone Array and Acoustic Beamformer," 14th International Congress on Sound & Vibration, Jul. 2007, 8 pgs.
Weinstein, et al., "LOUD: A 1020-Node Modular Microphone Array and Beamformer for Intelligent Computing Spaces," MIT Computer Science and Artifical Intelligence Laboratory, 2004, 18 pp.
Wung, "A System Approach to Multi-Channel Acoustic Echo Cancellation and Residual Echo Suppression for Robust Hands-Free Teleconferencing," Georgia Institute of Technology, May 2015, 167 pp.
XAP Audio Conferencing Brochure, ClearOne Communications, Inc., 2002. 78 pages.
Yamaha Corp., MRX7-D Signal Processor Product Specifications, 2016, 12 pgs.
Yamaha Corp., PJP-100H IP Audio Conference System Owner's Manual, Sep. 2006, 59 pgs.
Yamaha Corp., PJP-EC200 Conference Echo Canceller Brochure, Oct. 2009, 2 pgs.
Yan et al., Convex Optimization Based Time-Domain Broadband Beamforming with Sidelobe Control, Journal of the Acoustical Society of America, vol. 121, No. 1, Jan. 2007, pp. 46-49.
Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.
Yermeche, et al., "Real-Time DSP Implementation of a Subband Beamforming Algorithm for Dual Microphone Speech Enhancement," 2007 IEEE International Symposium on Circuits and Systems, 4 pp.
Zavarehei, et al., "Interpolation of Lost Speech Segments Using LP-HNM Model with Codebook Post-Processing," IEEE Transactions on Multimedia, vol. 10, No. 3, Apr. 2008, 10 pp.
Zhang, et al., "F-T-LSTM based Complex Network for Joint Acoustic Echo Cancellation and Speech Enhancement," Audio, Speech and Language Processing Group, Jun. 2021, 5 pp.
Zhang, et al., "Multichannel Acoustic Echo Cancelation in Multiparty Spatial Audio Conferencing with Constrained Kalman Filtering," 11th International Workshop on Acoustic Echo and Noise Control, Sep. 14, 2008, 4 pp.
Zhang, et al., "Selective Frequency Invariant Uniform Circular Broadband Beamformer," EURASIP Journal on Advances in Signal Processing, vol. 2010, pp. 1-11.
Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.
Double Condenser Microphone SM 69, Datasheet, Georg Neumann GmbH, available at <https://ende.neumann.com/product_files/7453/download>, 8 pp.
Eargle, "The Microphone Handbook," Elar Publ. Co., 1st ed., 1981, 4 pp.
Enright, Notes From Logan, June edition of Scanlines, Jun. 2009, 9 pp.
Fan, et al., "Localization Estimation of Sound Source by Microphones Array," Procedia Engineering 7, 2010, pp. 312-317.
Firoozabadi, et al., "Combination of Nested Microphone Array and Subband Processing for Multiple Simultaneous Speaker Localization," 6th International Symposium on Telecommunications, Nov. 2012, pp. 907-912.
Flanagan et al., Autodirective Microphone Systems, Acustica, vol. 73, 1991, pp. 58-71.
Flanagan, et al., "Computer-Steered Microphone Arrays for Sound Transduction in Large Rooms," J. Acoust. Soc. Am. 78 (5), Nov. 1985, pp. 1508-1518.
Fohhn Audio New Generation of Beam Steering Systems Available Now, audioXpress Staff, May 10, 2017, 8 pp.
Fox, et al., "A Subband Hybrid Beamforming for In-Car Speech Enhancement," 20th European Signal rocessing Conference, Aug. 2012, 5 pp.
Frost, III, An Algorithm for Linearly Constrained Adaptive Array Processing, Proc. IEEE, vol. 60, No. 8, Aug. 1972, pp. 926-935.
Gannot et al., Signal Enhancement using Beamforming and Nonstationarity with Applications to Speech, IEEE Trans. On Signal Processing, vol. 49, No. 8, Aug. 2001, pp. 1614-1626.
Gansler et al., A Double-Talk Detector Based on Coherence, IEEE Transactions on Communications, vol. 44, No. 11, Nov. 1996, pp. 1421-1427.
Gazor et al., Robust Adaptive Beamforming via Target Tracking, IEEE Transactions on Signal Processing, vol. 44, No. 6, Jun. 1996, pp. 1589-1593.
Gazor et al., Wideband Multi-Source Beamforming with Adaptive Array Location Calibration and Direction Finding, 1995 International Conference on Acoustics, Speech, and Signal Processing, May 1995, pp. 1904-1907.
Gentner Communications Corp., AP400 Audio Perfect 400 Audioconferencing System Installation & Operation Manual, Nov. 1998, 80 pgs.
Gentner Communications Corp., XAP 800 Audio Conferencing System Installation & Operation Manual, Oct. 2001, 152 pgs.
Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.
Giuliani, et al., "Use of Different Microphone Array Configurations for Hands-Free Speech Recognition in Noisy and Reverberant Environment," IRST-Istituto per la Ricerca Scientifica e Tecnologica, Sep. 22, 1997, 4 pp.
Gritton et al., Echo Cancellation Algorithms, IEEE ASSP Magazine, vol. 1, issue 2, Apr. 1984, pp. 30-38.
Hald, et al., "A class of optimal broadband phased array geometries designed for easy construction," 2002 Int'l Congress & Expo. on Noise Control Engineering, Aug. 2002, 6 pp.
Hamalainen, et al., "Acoustic Echo Cancellation for Dynamically Steered Microphone Array Systems," 2007 IEEE Workshop on Applications of Signal Processing to Audio and Acoustics, Oct. 2007, pp. 58-61.
Hayo, Virtual Controls for Real Life, Web page downloaded from https://hayo.io/ on Sep. 18, 2019, 19 pp.
Herbordt et al., A Real-time Acoustic Human-Machine Front-End for Multimedia Applications Integrating Robust Adaptive Beamforrning and Stereophonic Acoustic Echo Cancellation, 7th International Conference on Spoken Language Processing, Sep. 2002, 4 pgs.
Herbordt et al., GSAEC—Acoustic Echo Cancellation embedded into the Generalized Sidelobe Canceller, 10th European Signal Processing Conference, Sep. 2000, 5 pgs.
Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.
Herbordt, "Combination of Robust Adaptive Beamforming with Acoustic Echo Cancellation for Acoustic Human/Machine Interfaces," Friedrich-Alexander University, 2003, 293 pgs.
Herbordt, et al., Joint Optimization of LCMV Beamforming and Acoustic Echo Cancellation for Automatic Speech Recognition,

(56) References Cited

OTHER PUBLICATIONS

IEEE International Conference on Acoustics, Speech, and Signal Processing, Mar. 2005, pp. III-77-III-80.
Holm, "Optimizing Microphone Arrays for use in Conference Halls," Norwegian University of Science and Technology, Jun. 2009, 101 pp.
Huang et al., Immersive Audio Schemes: The Evolution of Multiparty Teleconferencing, IEEE Signal Processing Magazine, Jan. 2011, pp. 20-32.
ICONYX Gen5, Product Overview; Renkus-Heinz, Dec. 24, 2018, 2 pp.
International Search Report and Written Opinion for PCT/US2016/022773 dated Jun. 10, 2016. 13 pages.
International Search Report and Written Opinion for PCT/US2016/029751 dated Nov. 28, 2016, 21 pp.
International Search Report and Written Opinion for PCT/US2018/013155 dated Jun. 8, 2018. 12 pages.
International Search Report and Written Opinion for PCT/US2018/015269 dated Mar. 26, 2018, 12 pp.
International Search Report and Written Opinion for PCT/US2019/031833 dated Jul. 24, 2019, 16 pp.
International Search Report and Written Opinion for PCT/US2019/033470 dated Jul. 31, 2019, 12 pp.
International Search Report and Written Opinion for PCT/US2019/034692 dated Sep. 10, 2019, 11 pp.
International Search Report and Written Opinion for PCT/US2019/051491 dated Dec. 10, 2019, 13 pp.
International Search Report and Written Opinion for PCT/US2019/051989 dated Jan. 10, 2020, 15 pp.
International Search Report and Written Opinion for PCT/US2020/024063 dated Aug. 31, 2020, 18 pp.
International Search Report and Written Opinion for PCT/US2020/035185 dated Sep. 15, 2020, 11 pp.
International Search Report and Written Opinion for PCT/US2020/058385 dated Mar. 31, 2021, 20 pp.
International Search Report and Written Opinion for PCT/US2021/070625 dated Sep. 17, 2021, 17 pp.
International Search Report and Written Opinion for PCT/US2022/014061 dated May 10, 2022, 14 pp.
International Search Report and Written Opinion for PCT/US2022/045694 dated Mar. 17, 2023, 19 pp.
International Search Report and Written Opinion for PCT/US2022/079056 dated Feb. 17, 2023, 13 pp.
International Search Report for PCT/US2020/024005 dated Jun. 12, 2020, 12 pp.
Invensense, "Microphone Array Beamforming," Application Note AN-1140, Dec. 31, 2013, 12 pp.
Invensense, Recommendations for Mounting and Connecting InvenSense MEMS Microphones, Application Note AN-1003, 2013, 11 pp.
Invitation to Pay Additional Fees for PCT/US2022/045694 dated Jan. 24, 2023, 13 pp.
"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021. 8 pages.
"Vsa 2050 II Digitally Steerable Column Speaker," Web page https://www.rcf.it/en_US/products/product-detail/vsa-2050-ii/972389, 15 pages, Dec. 24, 2018.
Advanced Network Devices, IPSCM Ceiling Tile IP Speaker, Feb. 2011, 2 pgs.
Advanced Network Devices, IPSCM Standard 2' by 2' Ceiling Tile Speaker, 2 pgs.
Affes, et al., "A Signal Subspace Tracking Algorithm for Microphone Array Processing of Speech," IEEE Trans. On Speech and Audio Processing, vol. 5, No. 5, Sep. 1997, pp. 425-437.
Affes, et al., "A Source Subspace Tracking Array of Microphones for Double Talk Situations," 1996 IEEE International Conference on Acoustics, Speech, and Signal Processing Conference Proceedings, May 1996, pp. 909-912.
Affes, et al., "An Algorithm for Multisource Beamforming and Multitarget Tracking," IEEE Trans. On Signal Processing, vol. 44, No. 6, Jun. 1996, pp. 1512-1522.
Affes, et al., "Robust Adaptive Beamforming via LMS-Like Target Tracking," Proceedings of IEEE International Conference on Acoustics, Speech and Signal Processing, Apr. 1994, pp. IV-269-IV-272.
Ahonen, et al., "Directional Analysis of Sound Field with Linear Microphone Array and Applications in Sound Reproduction," Audio Engineering Socity, Convention Paper 7329, May 2008, 11 pp.
Alarifi, et al., "Ultra Wideband Indoor Positioning Technologies: Analysis and Recent Advances," Sensors 2016, vol. 16, No. 707, 36 pp.
Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr 12?dchild=1&keywords=drop+ceiling+return+air+grille&qid=1585862723&s=hi&sr=1-2>, 11 pp.
Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.
Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.
Armstrong Woodworks Concealed Catalog available at <https://sweets.construction.com/swts_content_files/3824/442581.pdf>, 2014, 6 pp.
Armstrong Woodworks Walls Catalog available at <https://www.armstrongceilings.com/pdbupimagesclg/220600.pdf/download/data-sheet-woodworks-walls.pdf>, 2019, 2 pp.
Armstrong World Industries, Inc., I-Ceilings Sound Systems Speaker Panels, 2002, 4 pgs.
Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.
Armstrong, Ceiling Systems, Brochure page for Armstrong Softlook, 1995, 2 pp.
Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.
Armstrong, i-Ceilings, Brochure, 2009, 12 pp.
Arnold, et al., "A Directional Acoustic Array Using Silicon Micromachined Piezoresistive Microphones," Journal of the Acoustical Society of America, 113(1), Jan. 2003, 10 pp.
Atlas Sound, 1128SYSM IP Compliant Loudspeaker System with Microphone Data Sheet, 2009, 2 pgs.
Atlas Sound, 1'X40' IP Speaker with Micophone for Suspended Ceiling Systems, https://www.atlasied.com/i128sysm, retrieved Oct. 25, 2017, 5 pgs.
Audio Technica, ES945 Omnidirectional Condenser Boundary Microphones, https://eu.audio-technica.com/resources/ES945%20Specifications.pdf, 2007, 1 pg.
Audix Microphones, Audix Introduces Innovative Ceiling Mics, http://audixusa.com/docs_12/latest_news/EFplFkAAkIOtSdolke.shtml, Jun. 2011, 6 pgs.
Audix Microphones, M70 Flush Mount Ceiling Mic, May 2016, 2 pgs.
Automixer Gated, Information Sheet, MIT, Nov. 2019, 9 pp.
Beh, et al., "Combining Acoustic Echo Cancellation and Adaptive Beamforming for Achieving Robust Speech Interface in Mobile Robot," 2008 IEEE/RSJ International Conference on Intelligent Robots and Systems, Sep. 2008, pp. 1693-1698.
Benesty, et al., "A New Class of Doubletalk Detectors Based on Cross-Correlation," IEEE Transactions on Speech and Audio Processing, vol. 8, No. 2, Mar. 2000, pp. 168-172.

(56) References Cited

OTHER PUBLICATIONS

Benesty, et al., "Adaptive Algorithms for Mimo Acoustic Echo Cancellation," Al2 Allen Institute for Artifical Intelligence, 2003. 30 pages.
Benesty, et al., "Differential Beamforming," Fundamentals of Signal Enhancement and Array Signal Processing, First Edition, 2017, 39 pp.
Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.
Benesty, et al., "Microphone Array Signal Processing," Springer, 2010, 20 pp.
Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.
Beyer Dynamic, Classis BM 32-33-34 DE-EN-FR 2016, 1 pg.
Beyer Dynamic, Classis-BM-33-PZ A1, 2013, 1 pg.
BnO055, Intelligent 9-axis absolute orientation sensor, Data sheet, Bosch, Nov. 2020, 118 pp.
Boyd, et al., Convex Optimization, Mar. 15, 1999, 216 pgs.
Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.
Bruel & Kjaer, by J.J. Christensen and J. Hald, Technical Review: Beamforming, No. 1, 2004, 54 pgs.
BSS Audio, Soundweb London Application Guides, 2010, 120 pgs.
Buchner, et al., "An Acoustic Human-Machine Interface with Multi-Channel Sound Reproduction," IEEE Fourth Workshop on Multimedia Signal Processing, Oct. 2001, pp. 359-364.
Buchner, et al., "An Efficient Combination of Multi-Channel Acoustic Echo Cancellation with a Beamforming Microphone Array," International Workshop on Hands-Free Speech Communication (HSC2001), Apr. 2001, pp. 55-58.
Buchner, et al., "Full-Duplex Communication Systems Using Loudspeaker Arrays and Microphone Arrays," IEEE International Conference on Multimedia and Expo, Aug. 2002, pp. 509-512.
Buchner, et al., "Generalized Multichannel Frequency-Domain Adaptive Filtering: Efficient Realization and Application to Hands-Free Speech Communication," Signal Processing 85, 2005, pp. 549-570.
Buchner, et al., "Multichannel Frequency-Domain Adaptive Filtering with Application to Multichannel Acoustic Echo Cancellation," Adaptive Signal Processing, 2003, pp. 95-128.
Buck, "Aspects of First-Order Differential Microphone Arrays in the Presence of Sensor Imperfections," Transactions on Emerging Telecommunications Technologies, 13.2, 2002, 8 pp.
Buck, et al., "First Order Differential Microphone Arrays for Automotive Applications," 7th International Workshop on Acoustic Echo and Noise Control, Darmstadt University of Technology, Sep. 10-13, 2001, 4 pp.
Ishii et al., Investigation on Sound Localization using Multiple Microphone Arrays, Reflection and Spatial Information, Japanese Society for Artificial Intelligence, JSAI Technical Report, SIG-Challenge-B202-11, 2012, pp. 64-69.
Ito et al., Aerodynamic/Aeroacoustic Testing in Anechoic Closed Test Sections of Low-speed Wind Tunnels, 16th AIAA/CEAS Aeroacoustics Conference, 2010, 11 pgs.
Johansson et al., Robust Acoustic Direction of Arrival Estimation using Root-SRP-PHAT, a Realtime Implementation, IEEE International Conference on Acoustics, Speech, and Signal Processing, Mar. 2005, 4 pgs.
Johansson, et al., Speaker Localisation using the Far-Field SRP-PHAT in Conference Telephony, 2002 International Symposium on Intelligent Signal Processing and Communication Systems, 5 pgs.
Johnson, et al., "Array Signal Processing: Concepts and Techniques," p. 59, Prentice Hall, 1993, 3 pp.
Julstrom et al., Direction-Sensitive Gating: A New Approach to Automatic Mixing, J. Audio Eng. Soc., vol. 32, No. 7/8, Jul./Aug. 1984, pp. 490-506.
Kahrs, Ed., The Past, Present, and Future of Audio Signal Processing, IEEE Signal Processing Magazine, Sep. 1997, pp. 30-57.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.
Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.
Klegon, "Achieve Invisible Audio with the MXA910 Ceiling Array Microphone," Jun. 27, 2016, 10 pp.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Kolundžija, et al., "Baffled circular loudspeaker array with broadband high directivity," 2010 IEEE International Conference on Acoustics, Speech and Signal Processing, Dallas, TX, 2010, pp. 73-76.
Lai, et al., "Design of Robust Steerable Broadband Beamformers with Spiral Arrays and the Farrow Filter Structure," Proc. Intl. Workshop Acoustic Echo Noise Control, 2010, 4 pp.
Lebret, et al., Antenna Array Pattern Synthesis via Convex Optimization, IEEE Trans. on Signal Processing, vol. 45, No. 3, Mar. 1997, pp. 526-532.
LecNet2 Sound System Design Guide, Lectrosonics, Jun. 2, 2006. 28 pages.
Lectrosonics, LecNet2 Sound System Design Guide, Jun. 2006, 28 pgs.
Lee et al., Multichannel Teleconferencing System with Multispatial Region Acoustic Echo Cancellation, International Workshop on Acoustic Echo and Noise Control (IWAENC2003), Sep. 2003, pp. 51-54.
Li, "Broadband Beamforming and Direction Finding Using Concentric Ring Array," Ph.D. Dissertation, University of Missouri-Columbia, Jul. 2005, 163 pp.
Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.
Liu et al., Adaptive Beamforming with Sidelobe Control: A Second-Order Cone Programming Approach, IEEE Signal Proc. Letters, vol. 10, No. 11, Nov. 2003, pp. 331-334.
Liu, et al., "Frequency Invariant Beamforming in Subbands," IEEE Conference on Signals, Systems and Computers, 2004, 5 pp.
Liu, et al., "Wideband Beamforming," Wiley Series on Wireless Communications and Mobile Computing, pp. 143-198, 2010, 297 pp.
Lobo, et al., Applications of Second-Order Cone Programming, Linear Algebra and its Applications 284, 1998, pp. 193-228.

(56) References Cited

OTHER PUBLICATIONS

Luo et al., Wideband Beamforming with Broad Nulls of Nested Array, Third Int'l Conf. on Info. Science and Tech., Mar. 23-25, 2013, pp. 1645-1648.
Marquardt et al., A Natural Acoustic Front-End for Interactive TV in the EU-Project DICIT, IEEE Pacific Rim Conference on Communications, Computers and Signal Processing, Aug. 2009, pp. 894-899.
Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.
Maruo et al., On the Optimal Solutions of Beamformer Assisted Acoustic Echo Cancellers, IEEE Statistical Signal Processing Workshop, 2011, pp. 641-644.
Matheja, et al., "Dynamic Signal Combining for Distributed Microphone Systems in Car Environments," 2011 IEEE International Conference on Acoustics, Speech and Signal Processing, May 22, 2011, 6 pp.
McCowan, Microphone Arrays: A Tutorial, Apr. 2001, 36 pgs.
MFLCRFG Datasheet, Metal_Fab Inc., Sep. 7, 2007, 1 p.
Microphone Array Primer, Shure Question and Answer Page, <https://service.shure.com/s/article/microphone-array- primer?language=en_US>, Jan. 2019, 5 pp.
Milanovic, et al., "Design and Realization of FPGA Platform for Real Time Acoustic Signal Acquisition and Data Processing" 22nd Telecommunications Forum TELFOR, 2014, 6 pp.
Mohammed, A New Adaptive Beamformer for Optimal Acoustic Echo and Noise Cancellation with Less Computational Load, Canadian Conference on Electrical and Computer Engineering, May 2008, pp. 000123-000128.
Mohammed, A New Robust Adaptive Beamformer for Enhancing Speech Corrupted with Colored Noise, AICCSA, Apr. 2008, pp. 508-515.
Mohammed, Real-time Implementation of an efficient RLS Algorithm based on IIR Filter for Acoustic Echo Cancellation, AICCSA, Apr. 2008, pp. 489-494.
Mohan, et al., "Localization of multiple acoustic sources with small arrays using a coherence test," Journal Acoustic Soc Am., 123(4), Apr. 2008, 12 pp.
Moulines, et al., "Pitch-Synchronous Waveform Processing Techniques for Text-to-Speech Synthesis Using Diphones," Speech Communication 9, 1990, 15 pp.
Multichannel Acoustic Echo Cancellation, Obtained from website http://www.buchner-net.com/mcaec.html, Jun. 2011. 3 pages.
Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.
New Shure Microflex Advance MXA910 Microphone With Intellimix Audio Processing Provides Greater Simplicity, Flexibility, Clarity, Press Release, Jun. 12, 2019, 4 pp.
Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.
Office Action for Taiwan Patent Application No. 105109900 dated May 5, 2017. 10 pages.
Office Action issued for Japanese Patent Application No. 2015-023781 dated Jun. 20, 2016, 4 pp.
Oh, et al., "Hands-Free Voice Communication in an Automobile With a Microphone Array," 1992 IEEE International Conference on Acoustics, Speech, and Signal Processing, Mar. 1992, pp. 1-281-1-284.
Olszewski, et al., "Steerable Highly Directional Audio Beam Loudspeaker," Interspeech 2005, 4 pp.
Omologo, Multi-Microphone Signal Processing for Distant-Speech Interaction, Human Activity and Vision Summer School (HAVSS), INRIA Sophia Antipolis, Oct. 3, 2012, 79 pgs.
Order, Conduct of the Proceeding, *Clearone, Inc.* v. *Shure Acquisition Holdings, Inc.*, Nov. 2, 2020, 10 pp.
Pados et al., An Iterative Algorithm for the Computation of the MVDR Filter, IEEE Trans. On Signal Processing, vol. 49, No. 2, Feb. 2001, pp. 290-300.
Palladino, "This App Lets You Control Your Smarthome Lights via Augmented Reality," Next Reality Mobile AR News, Jul. 2, 2018, 5 pp.
Parikh, et al., "Methods for Mitigating IP Network Packet Loss in Real Time Audio Streaming Applications," GatesAir, 2014, 6 pp.
Pasha, et al., "Clustered Multi-channel Dereverberation for Ad-hoc Microphone Arrays," Proceedings of APSIPA Annual Summit and Conference, Dec. 2015, pp. 274-278.
Petitioner's Motion for Sanctions, *Clearone, Inc.* v. *Shure Acquisition Holdings, Inc.*, Aug. 24, 2020, 20 pp.
Pettersen, "Broadcast Applications for Voice-Activated Microphones," db, Jul./Aug. 1985, 6 pgs.
Pfeifenberger, et al., "Nonlinear Residual Echo Suppression using a Recurrent Neural Network," Interspeech 2020, 5 pp.
Phoenix Audio Technologies, "Beamforming and Microphone Arrays—Common Myths", Apr. 2016, http://info.phnxaudio.com/blog/microphone-arrays-beamforming-myths-1, 19 pp.
Plascore, PCGA-XR1 3003 Aluminum Honeycomb Data Sheet, 2008, 2 pgs.
Polycom Inc., Vortex EF2211/EF2210 Reference Manual, 2003, 66 pgs.
Polycom, Inc., Polycom SoundStructure C16, C12, C8, and SR12 Design Guide, Nov. 2013, 743 pgs.
Polycom, Inc., Setting Up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.
Polycom, Inc., Vortex EF2241 Reference Manual, 2002, 68 pgs.
Polycom, Inc., Vortex EF2280 Reference Manual, 2001, 60 pp.
Pomona, Model 3306, Datasheet, Jun. 9, 1999, 1 p.
Prime, et al., "Beamforming Array Optimisation Averaged Sound Source Mapping on a Model Wind Turbine," ResearchGate, Nov. 2014, 10 pp.
Rabinkin et al., Estimation of Wavefront Arrival Delay Using the Cross-Power Spectrum Phase Technique, 132nd Meeting of the Acoustical Society of America, Dec. 1996, pp. 1-10.
Rane Corp., Halogen Acoustic Echo Cancellation Guide, AEC Guide Version 2, Nov. 2013, 16 pgs.
Rao, et al., "Fast LMS/Newton Algorithms for Stereophonic Acoustic Echo Cancelation," IEEE Transactions on Signal Processing, vol. 57, No. 8, Aug. 2009. 12 pages.
Reuven et al., Joint Acoustic Echo Cancellation and Transfer Function GSC in the Frequency Domain, 23rd IEEE Convention of Electrical and Electronics Engineers in Israel, Sep. 2004, pp. 412-415.
Reuven et al., Joint Noise Reduction and Acoustic Echo Cancellation Using the Transfer-Function Generalized Sidelobe Canceller, Speech Communication, vol. 49, 2007, pp. 623-635.
Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.
Ristimaki, Distributed Microphone Array System for Two-Way Audio Communication, Helsinki Univ. of Technology, Master's Thesis, Jun. 15, 2009, 73 pgs.
Rombouts et al., An Integrated Approach to Acoustic Noise and Echo Cancellation, Signal Processing 85, 2005, pp. 849-871.
Sällberg, "Faster Subband Signal Processing," IEEE Signal Processing Magazine, vol. 30, No. 5, Sep. 2013, 6 pp.
Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.
Sennheiser, New microphone solutions for ceiling and desk installation, https://en-us.sennheiser.com/news-new-microphone-solutions-for-ceiling-and-desk-installation, Feb. 2011, 2 pgs.

(56) References Cited

OTHER PUBLICATIONS

Sennheiser, TeamConnect Ceiling, https://en-us.sennheiser.com/conference-meeting-rooms-teamconnect-ceiling, 2017, 7 pgs.
SerDes, Wikipedia article, last edited on Jun. 25, 2018; retrieved on Jun. 27, 2018, 3 pp., https://en.wikipedia.org/wiki/SerDes.
Sessler, et al., "Directional Transducers," IEEE Transactions on Audio and Electroacoustics, vol. AU-19, No. 1, Mar. 1971, pp. 19-23.
Sessler, et al., "Toroidal Microphones," Journal of Acoustical Society of America, vol. 46, No. 1, 1969, 10 pp.
Shure AMS Update, vol. 1, No. 1, 1983, 2 pgs.
Shure AMS Update, vol. 4, No. 4, 1997, 8 pgs.
Shure Debuts Microflex Advance Ceiling and Table Array Microphones, Press Release, Feb. 9, 2016, 4 pp.
Shure Inc., A910-HCM Hard Ceiling Mount, retrieved from website <http://www.shure.com/en-US/products/accessories/a910hcm> on Jan. 16, 2020, 3 pp.
Shure Inc., Microflex Advance, http://www.shure.com/americas/microflex-advance, 12 pgs.
Shure Inc., MX395 Low Profile Boundary Microphones, 2007, 2 pgs.
Shure Inc., MXA910 Ceiling Array Microphone, http://www.shure.com/americas/products/microphones/microflex-advance/mxa910-ceiling-array-microphone, 7 pp. 2009-2017.
Shure, MXA910 With IntelliMix, Ceiling Array Microphone, available at <https://www.shure.com/en-US/products/microphones/mxa910>, as early as 2020, 12 pp.
Shure, New MXA910 Variant Now Available, Press Release, Dec. 13, 2019, 5 pp.
Shure, Q&A in Response to Recent US Court Ruling on Shure MXA910, Available at <https://www.shure.com/en-US/meta/legal/q-and-a-inresponse-to-recent-US-court-ruling-on-shure-mxa910-response>, As early as 2020, 5 pp.
Shure, RK244G Replacement Screen and Grille, Datasheet, 2013, 1 p.
Shure, The Microflex Advance MXA310 Table Array Microphone, Available at <https://www.shure.com/en-US/products/microphones/mxa310>, As early as 2020, 12 pp.
Signal Processor MRX7-D Product Specifications, Yamaha Corporation, 2016. 12 pages.
Silverman et al., Performance of Real-Time Source-Location Estimators for a Large-Aperture Microphone Array, IEEE Transactions on Speech and Audio Processing, vol. 13, No. 4, Jul. 2005, pp. 593-606.
Sinha, Ch. 9: Noise and Echo Cancellation, in Speech Processing in Embedded Systems, Springer, 2010, pp. 127-142.
Buck, et al., "Self-Calibrating Microphone Arrays for Speech Signal Acquisition: A Systematic Approach," Signal Processing, vol. 86, 2006, pp. 1230-1238.
Burton, et al., "A New Structure for Combining Echo Cancellation and Beamforming in Changing Acoustical Environments," IEEE International Conference on Acoustics, Speech and Signal Processing, 2007, pp. 1-77-1-80.
BZ-3a Installation Instructions, XEDIT Corporation, Available at <chrome-extension://efaidnbmnnnibpcajpcglclefindmkaj/viewer.html?pdfurl=https%3A%2F%2Fwww.servoreelers.com%2Fmt-content%2Fuploads%2F2017%2F05%2Fbz-a-3universal-2017c.pdf&clen=189067&chunk=true>, 1 p.
Cabral, et al., Glottal Spectral Separation for Speech Synthesis, IEEE Journal of Selected Topics in Signal Processing, 2013, 15 pp.
Campbell, "Adaptive Beamforming Using a Microphone Array for Hands-Free Telephony," Virginia Polytechnic Institute and State University, Feb. 1999, 154 pgs.
Canetto, et al., "Speech Enhancement Systems Based on Microphone Arrays," VI Conference of the Italian Society for Applied and Industrial Mathematics, May 27, 2002, 9 pp.
Cech, et al., "Active-Speaker Detection and Localization with Microphones and Cameras Embedded into a Robotic Head," IEEE-RAS International Conference on Humanoid Robots, Oct. 2013, pp. 203-210.
Chan, et al., "Uniform Concentric Circular Arrays with Frequency-Invariant Characteristics-Theory, Design, Adaptive Beamforming and DOA Estimation," IEEE Transactions on Signal Processing, vol. 55, No. 1, Jan. 2007, pp. 165-177.
Chau, et al., "A Subband Beamformer on an Ultra Low-Power Miniature DSP Platform," 2002 IEEE International Conference on Acoustics, Speech, and Signal Processing, 4 pp.
Chen, et al., "A General Approach to the Design and Implementation of Linear Differential Microphone Arrays," Signal and Information Processing Association Annual Summit and Conference, 2013 Asia-Pacific, IEEE, 7 pp.
Chen, et al., "Design and Implementation of Small Microphone Arrays," PowerPoint Presentation, Northwestern Polytechnical University and Institut national de la recherche scientifique, Jan. 1, 2014, 56 pp.
Chen, et al., "Design of Robust Broadband Beamformers with Passband Shaping Characteristics using Tikhonov Regularization," IEEE Transactions on Audio, Speech, and Language Processing, vol. 17, No. 4, May 2009, pp. 565-681.
Chou, "Frequency-Independent Beamformer with Low Response Error," 1995 International Conference on Acoustics, Speech, and Signal Processing, pp. 2995-2998, May 9, 1995, 4 pp.
Chu, "Desktop Mic Array for Teleconferencing," 1995 International Conference on Acoustics, Speech, and Signal Processing, May 1995, pp. 2999-3002.
Circuit Specialists webpage for an aluminum enclosure, available at <https://www.circuitspecialists.com/metal-instrument-enclosure-la7.html?otaid=gpl&gclid=EAIaIQobChMI2JTw-Ynm6AlVgbblCh3F4QKuEAkYBiABEgJZMPD_BwE>, 3 pp, 2019.
ClearOne Introduces Ceiling Microphone Array With Built-In Dante Interface, Press Release; GlobeNewswire, Jan. 8, 2019, 2 pp.
ClearOne Launches Second Generation of its Groundbreaking Beamforming Microphone Array, Press Release, Acquire Media, Jun. 1, 2016, 2 pp.
ClearOne to Unveil Beamforming Microphone Array with Adaptive Steering and Next Generation Acoustic Echo Cancellation Technology, Press Release, InfoComm, Jun. 4, 2012, 1 p.
ClearOne , Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.
ClearOne , Beamforming Microphone Array, Mar. 2012, 6 pgs.
ClearOne , Ceiling Microphone Array Installation Manual, Jan. 9, 2012, 20 pgs.
ClearOne , Converge/Converge Pro, Manual, 2008, 51 pp.
ClearOne , Professional Conferencing Microphones, Brochure, Mar. 2015, 3 pp.
Coleman, "Loudspeaker Array Processing for Personal Sound Zone Reproduction," Centre for Vision, Speech and Signal Processing, 2014, 239 pp.
Cook, et al., An Altemative Approach to Interpolated Array Processing for Uniform Circular Arrays, Asia-Pacific Conference on Circuits and Systems, 2002, pp. 411-414.
Cox, et al., "Robust Adaptive Beamforming," IEEE Trans. Acoust., Speech, and Signal Processing, vol. ASSP-35, No. 10, Oct. 1987, pp. 1365-1376.
CTG Audio, Ceiling Microphone CTG CM-01, Jun. 5, 2008, 2 pgs.
CTG Audio, CM-01 & CM-02 Ceiling Microphones Specifications, 2 pgs.
CTG Audio, CM-01 & CM-02 Ceiling Microphones, 2017, 4 pgs.
CTG Audio, CTG FS-400 and RS-800 with "Beamforming" Technology, Datasheet, As early as 2009, 2 pp.
CTG Audio, CTG User Manual for the FS- 400/800 Beamforming Mixers, Nov. 2008, 26 pp.
CTG Audio, Expand Your IP Teleconferencing to Full Room Audio, Obtained from website htt. ):://www ct audio com/ex and-, our-i—teleconforencino-to-ful-room-audio-while-conquennc.1-echo-cancelation-issues Mull, 2014. 3 pages.
CTG Audio, Frequently Asked Questions, As early as 2009, 2 pp.
CTG Audio, Installation Manual and User Guidelines for the Soundman SM 02 System, May 2001, 29 pp.
CTG Audio, Installation Manual, Nov. 21, 2008, 25 pgs.

(56) References Cited

OTHER PUBLICATIONS

CTG Audio, Introducing the CTG FS-400 and FS-800 with Beamforming Technology, As early as 2008, 2 pp.
CTG Audio, Meeting the Demand for Ceiling Mics in the Enterprise 5 Best Practices, Brochure, 2012, 9 pp.
CTG Audio, White on White—Introducing the CM-02 Ceiling Microphone, https://ctgaudio.com/white-on-white-introducing-the-cm-02-ceiling-microphone/, Feb. 20, 2014, 3 pgs.
Dahl et al., Acoustic Echo Cancelling with Microphone Arrays, Research Report Mar. 1995, Univ. of Karlskrona/Ronneby, Apr. 1995, 64 pgs.
Decawave, Application Note: APR001, UWB Regulations, A Summary of Worldwide Telecommunications Regulations governing the use of Ultra-Wideband radio, Version 1.2, 2015, 63 pp.
Desiraju, et al., "Efficient Multi-Channel Acoustic Echo Cancellation Using Constrained Sparse Filter Updates in the Subband Domain," Acoustic Speech Enhancement Research, Sep. 2014, 4 pp.
DiBiase et al., Robust Localization in Reverberent Rooms, in Brandstein, ed., Microphone Arrays: Techniques and Applications, 2001, Springer-Verlag Berlin Heidelberg, pp. 157-180.
Diethorn, "Audio Signal Processing For Next-Generation Multimedia Communication Systems," Chapter 4, 2004, 9 pp.
Digikey webpage for Converta box (last visited Apr. 22, 2020) <https://www.digikey.com/product-detail/en/bud-industries/CU-452-A/377-1969-ND/439257? utm_adgroup=Boxes&utm_source=google&utm_medium=cpc&utm_campaign=Shopping_Boxes%2C%20Enclosures %2C%20Racks_NEW&utm_term=&utm_content=Boxes&gclid=EAlalQobChMI2JTw-Ynm6AlVgbblCh3F4QKuEAkYCSABEgKybPD_BwE>, 3 pp.
Digikey webpage for Pomona Box (last visited Apr. 22, 2020) available at <https://www.digikey.com/product-detail/en/pomonaelectronics/3306/501-2054-ND/736489>, 2 pp.
Digital Wireless Conference System, MCW-D 50, Beyerdynamic Inc., 2009, 18 pp.
Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. I-121-I-124.
Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.
Dormehl, "Hololens concept lets you control your smart home via augmented reality," digitaltrends, Jul. 26, 2016, 12 pp.
Avnetwork, "Top Five Conference Room Mic Myths," Feb. 25, 2015, 14 pp.
Brandstein, et al., "Microphone Arrays: Signal Processing Techniques and Applications," Digital Signal Processing, Springer-Verlag Berlin Heidelberg, 2001, 401 pgs.
Cao, "Survey on Acoustic Vector Sensor and its Applications in Signal Processing" Proceedings of the 33rd Chinese Control Conference, Jul. 2014, 17 pp.
Powers, et al., "Proving Adaptive Directional Technology Works: A Review of Studies," The Hearing Review, Apr. 6, 2004, 5 pp.

* cited by examiner

DISTRIBUTED ALGORITHM FOR AUTOMIXING SPEECH OVER WIRELESS NETWORKS

CROSS-REFERENCE

This application claims the benefit of U.S. Provisional Patent Application No. 63/263,641, filed on Nov. 5, 2021, and is fully incorporated by reference in its entirety herein.

TECHNICAL FIELD

This application generally relates to systems and methods for networked audio automixing in wireless networks. In particular, this application relates to systems and methods for distributed processing and gating decision making between one or more wireless microphone units and a central access point or mixer, to enable optimized granting of wireless audio channels to particular wireless microphone unit(s).

BACKGROUND

Conferencing and presentation environments, such as boardrooms, conferencing settings, and the like, can involve the use of multiple wireless microphones for capturing sound from various audio sources. The audio sources may include human speakers, for example. The captured sound may be disseminated to a local audience in the environment through amplified speakers (for sound reinforcement), and/or to others remote from the environment (such as via a telecast and/or a webcast). The audio from each microphone may be wirelessly transmitted to a central access point for processing, such as for determining the granting of wireless communication channels and/or for mixing of the audio from the microphones.

Typically, captured sound may also include noise (e.g., undesired non-voice or non-human sounds) in the environment, including constant noises such as from ventilation, machinery, and electronic devices, and errant noises such as sudden, impulsive, or recurrent sounds like shuffling of paper, opening of bags and containers, chewing, typing, etc. To minimize noise in captured sounds, the central access point may include an automixer that can be utilized to automatically gate and/or attenuate a particular microphone's audio signal to mitigate the contribution of background, static, or stationary noise when it is not capturing human speech or voice. Voice activity detection (VAD) algorithms may also be used to minimize errant noises in captured sound by detecting the presence or absence of human speech or voice. Other noise reduction techniques can reduce certain background, static, or stationary noise, such as fan and HVAC system noise.

In the context of a wireless audio system, the inclusion of multiple microphones that are communicatively coupled to the automixer may bring additional challenges related to latency, channel allocation for the various microphones, gating decisions, noise mitigation, and more.

Accordingly, there is an opportunity for systems and methods that address these concerns. More particularly, there is an opportunity for systems and methods for a network of wirelessly connected devices that can each perform portions of the gating decision process in order to offload processing from the central access point. Further, there is an opportunity for systems and methods that enable a determination by a central access point of which microphones to grant wireless communications channels in order to reduce the amount of bandwidth required by the system at any given time. Still further, there is an opportunity for systems and methods that enable the wireless audio system to address issues with latency caused by the time delays required to perform various aspects of the decision making and channel setup.

SUMMARY

The invention is intended to solve the above-noted problems by providing systems and methods that are designed to, among other things: (1) utilize a system having distributed processing, wherein the processing capability of individual wireless microphone units (e.g., wireless delegate units (WDUs)) are used to determine preliminary gating decisions for the wireless microphone unit (without the need for transmitting audio data to a central access point having a mixer); (2) transmitting an access request from the wireless microphone unit to the central access point when the wireless microphone unit determines that an input audio signal at the wireless microphone unit is above a given threshold and/or meets certain requirements; (3) determine, by the central access point, a winning wireless microphone unit when multiple access requests are received from multiple wireless microphone units within a given period of time, e.g., a "competition period;" and (4) grant the winning wireless microphone unit a wireless communication channel to enable the transmission of audio data from the winning wireless microphone unit to the central access point (which can then be processed by the mixer in the central access point to produce an output mixed audio signal).

In an embodiment, a wireless audio system may include a plurality of wireless microphone units and a central access point having a mixer. Each of the plurality of wireless microphone units may include one or more microphones or microphone arrays, each configured to provide one or more audio input signals, and a processing unit. The processing unit may be configured to receive one or more input audio signals from the microphones or microphone arrays, and determine whether the input audio signal(s) are above one or more thresholds or meet certain criteria. Upon determining that a given input audio signal is above the threshold(s) or meets the criteria, the wireless microphone unit may then transmit an access request to the central access point to request that a wireless communication channel be granted for that wireless microphone unit. The central access point may receive the access request, and begin a competition period during which other wireless microphone units may transmit access requests to the central access point. The central access point then determines a winner or best wireless microphone unit based on all the received access requests received during the competition period, and grants the winning wireless microphone unit a wireless communication channel. The central access point may also be configured to generate a final mix audio signal based the audio signal from all the gated on wireless microphone units, and/or all the wireless microphone units for which there is an active communication channel with the central access point.

This and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
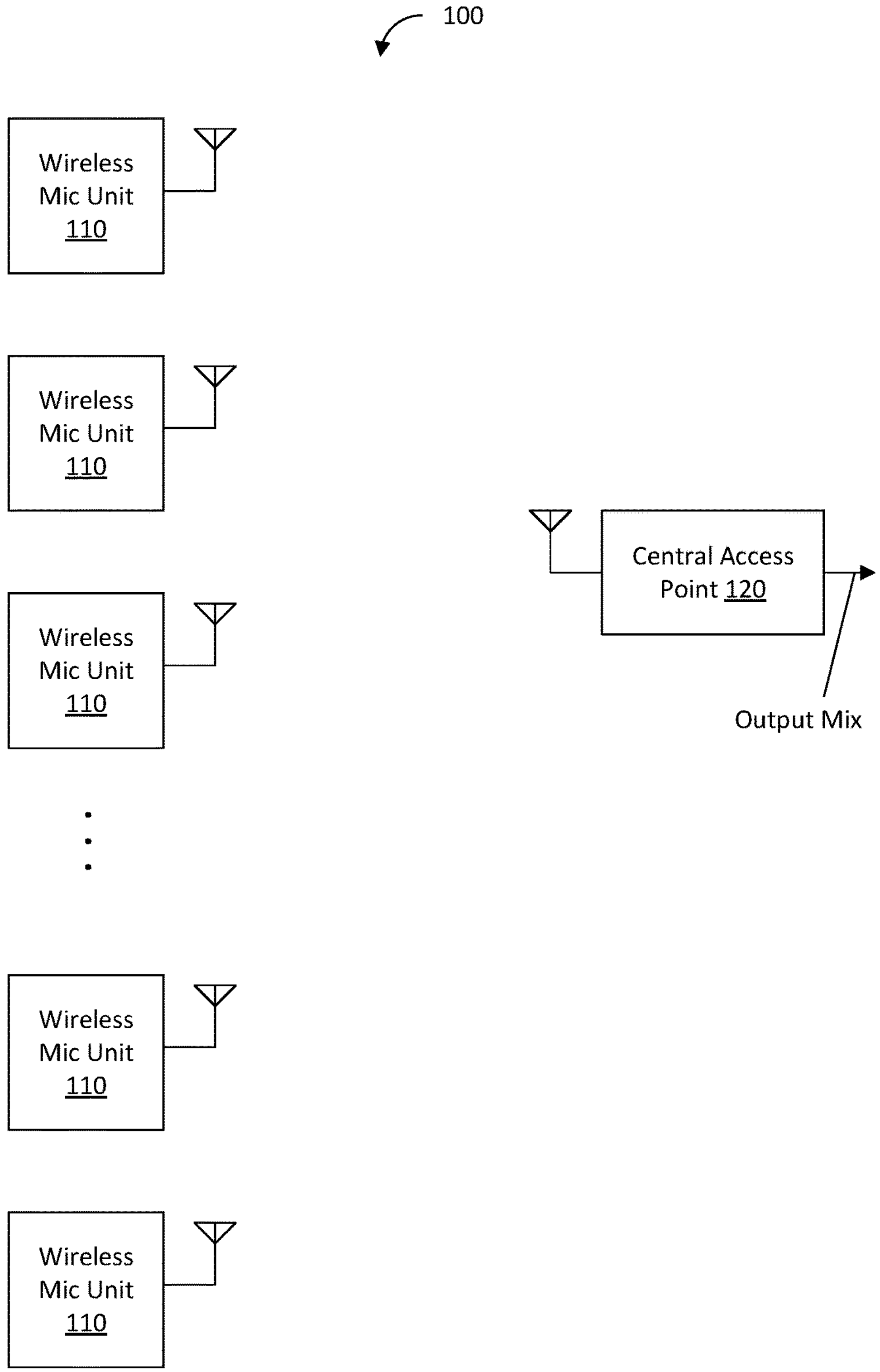
FIG. 1 is a schematic diagram of a system including a plurality of wireless microphone units (such as wireless delegate units (WDUs)), and a central access point for automixing of audio signals and for granting of wireless communications channels, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The systems and methods described herein can include an audio system that includes a plurality of wireless microphone units, such as wireless delegate units (WDUs), and a central access point having a mixer. The system may include any number of wireless microphone units, such as 1, 10, 100, or more, all positioned within an environment or multiple environments. The central access point of the system may be coupled to the plurality of wireless microphone units via one or more wireless communication channels, and may be configured to receive audio data (and/or other data) from the wireless microphone units in order to produce a final output mix signal.

In one exemplary scenario in which the system of this disclosure may be used, there may be a desire to prevent wireless microphone units from being gated on or transmitting audio to the central access point unless the audio picked up by the wireless microphone unit meets certain criteria. Additionally, where multiple wireless microphone units are positioned in relative close proximity (e.g., in a conference room), it is possible that a single audio source (e.g., a human talker) may be picked up by multiple wireless microphone units. It may be desirable for a decision to be made for which single designated or best wireless microphone unit is to be used for that single audio source, rather than having multiple wireless microphone unit all be gated on based on the single audio source. This decision making can enable fewer wireless communication channels to be utilized by the system.

In some examples, the wireless microphone units may transmit access requests to the central access point that request the granting of a wireless channel to the wireless microphone unit for the purpose of transmitting the input audio signal. However, due to the inherent uncertainty of the wireless environment, the first wireless microphone unit to detect a given audio source may not necessarily correspond to the first access request received by the central access point. The systems and methods described herein can be utilized to identify the "best" access request and enable the central access point to make a relatively more optimal decision about which wireless microphone unit is to be gated on and granted a wireless communication channel.

In embodiments of the present disclosure, processing and decision making may be split between the central access point and the wireless microphone units, which can enable improved operation without significantly increasing the processing or communication costs. When a person speaks and the audio is picked up by one or more wireless microphone units, each wireless microphone unit can make a determination on its own whether the input audio includes speech or other desirable audio, or whether the input audio is noise or other undesirable audio. This may be referred to as "voice detection," and by enabling each wireless microphone unit to perform this step individually, the overall system processing can be distributed such that the central access point no longer makes these initial decisions.

The wireless microphone units may also make an initial or preliminary gating decision. The preliminary gating decision can involve comparing the input audio metrics (e.g., signal level) to various thresholds and criteria. If the wireless microphone unit determines that the input audio signal is not desirable, the wireless microphone unit does not transmit any access request to the central access point in association with this determination, thereby reducing the processing resources the central access point is otherwise tasked with. If the wireless microphone unit determines that the input audio signal is desirable, the wireless microphone unit can transmit an access request to the central access point. The central access point may then receive the access request from the wireless microphone unit (and possibly from one or more other wireless microphone units), and make a final gating decision to determine which of the wireless microphone units is to be granted a wireless communication channel. This may be particularly important where a single audio source (e.g., a person who begins speaking) is picked up by two or more wireless microphone units, all of which determine that the input audio is desirable. In this scenario, the central access point may receive access requests from each of the wireless microphone units that picked up the input audio and determined it was desirable, and then can determine which wireless microphone unit is relatively best suited to continue and provide the input audio to the central access point. The determined designated or otherwise best suited wireless microphone unit ("winner") may then be granted a wireless communications channel, and audio transmission can occur between the winning wireless microphone unit and the central access point via this granted channel. The mixer in the wireless microphone unit may utilize the audio received via the granted channel to mix it with other gated on channels to generate the final mix output signal.

FIG. 1 is a schematic diagram of a system 100 including a plurality of wireless microphone units 110 (e.g., wireless delegate units) and a central access point 120 for the automixing of audio signals from one or more of the wireless microphone units 110 and for determining the granting of wireless communications channels. Environments such as conference rooms, churches, etc. may utilize the system 100 to facilitate communication with persons at a remote location and/or for sound reinforcement, for example. The environment may include desirable audio sources (e.g., human speakers) and/or undesirable audio sources (e.g., noise from ventilation, other persons, audio/visual equipment, electronic devices, etc.). The system 100 may result in the output of a final mix audio signal based on the granting of communication channels only to specific wireless microphone units that have been determined to be the best suited for capturing the desirable audio.

Each of the wireless microphone units 110 may detect sound in the environment, and be placed on or in a table, lectern, desktop, wall, ceiling, etc. so that the sound from the audio sources can be detected and captured, such as speech spoken by human speakers. Each of the wireless microphone units 110 may include any number of microphone elements, and in some cases may be able to form multiple pickup patterns with lobes so that the sound from the audio sources can be detected and captured. Any appropriate number of microphone elements are possible and contemplated in each of the wireless microphone units 110.

The various components included in the system 100 (e.g., the wireless microphone units 110 and the central access point 120) may be implemented using software executable by one or more computing devices, such as a laptop, desktop, tablet, smartphone, etc. Such a computer device may comprise one or more processors, memories, graphics processing units (GPUs), discrete logic circuits, application specific integrated circuits (ASIC), programmable gate arrays (PGA), field programmable gate arrays (FPGA), etc., one or more of which may be configured to perform some or all of the techniques described herein.

As described in more detail below, a processing unit in each of the wireless microphone units 110 may enable various functions, such as receiving the input audio signal, determining one or more levels or metrics associated with the input audio signal, determining whether the input audio signal includes speech or not (e.g., voice detection), making a preliminary gating decision, and causing the transmission of an access request.

The central access point 120 may receive an access request from one or more wireless microphone units 110, make a final gating decision for each wireless microphone unit that has sent a request within the competition period (as described in further detail below), and generate a final mix audio signal. In embodiments, the central access point 120 may also transmit updated winning metrics and other relevant information to one or more of the wireless microphone units, which may use the metrics in their preliminary gating decisions.

In some examples, the wireless microphone units 110 and the central access point 120, either alone or in combination, may be configured to eliminate or mitigate handling noise or "book drop" noise which may have been picked up by the wireless microphone units 110. For example, a voice activity detection (VAD) algorithm may perform spectral analysis of the input signal to classify the input signal as containing voiced speech, unvoiced speech, or non-speech. Non-speech classifications may be used during the preliminary gating decision to reduce unwanted channel requests. Additionally, non-speech classifications may be sent from the wireless microphone units 110 to the central access point 120, and those non-speech classifications which arrive shortly after the corresponding wireless microphone unit has been granted a channel may be used as a trigger or event that causes the central access point 120 to quickly release the channel (e.g., revoke the channel that was just granted to the wireless microphone unit), due to a likely false-trigger situation. In some embodiments, the wireless microphone units 110 may send a "release channel" control message to the central access point 120 to cause the central access point 120 to release the channel, if and when non-speech classifications are made within a short time window after a channel is granted.

In some examples, the wireless microphone units 110 and the central access point 120, either alone or in combination, may be configured to mitigate latency caused by the time delays resulting from the determination of the one or more metrics of the input audio signal, preliminary gating decision, transmission of an access request, and/or the final gating decision made by the central access point 120. When a channel has been granted and audio is being transmitted by a given microphone, the system may operate with a certain latency, e.g., approximately 15 ms. However, the time delay caused by the processes described herein (e.g., the preliminary gating decision, competition period, channel setup/grant, etc.) can increase the latency (e.g., to up to 100 ms or more).

To address such latencies, and to avoid cutting off the beginning portion of sound that is captured while the gating decisions and channel setup are being determined, the wireless microphone units 110 may be configured to execute a time compression algorithm that can: (1) store the input audio signal in a buffer, (2) compress the input audio in time by removing certain segments such as noise, silence, and certain periodic content, and (3) when a channel has been granted to the wireless microphone unit 110, begin playback of the time-compressed signal from the buffer until the latency is removed, and the audio is being transmitted in real time or near-real time. Exemplary embodiments of techniques for time-compression of an input audio signal are described in commonly-assigned U.S. Pat. No. 10,997,982, entitled "Systems and Methods for Intelligent Voice Activation for Auto-Mixing," which is incorporated by reference in its entirety herein.

The system as a whole may benefit in each of these situations by limiting channel usage to only legitimate speech, while also preventing handling noises from contributing to the final output mix and/or from consuming valuable bandwidth.

The system 100 may include one or more features that enable the various functions of the wireless microphone units 110 and central access point 120 to operate. For instance, the system 100 may operate using a common clock signal. All devices that are a part of the system 100 may be time synchronized such that they are locked to a common clock signal. Furthermore, the system 100 may include a synchronized audio/wireless frame counter (e.g., where the system operates based on a frame scheme) for use as time stamps. Additionally, the system 100 may include sufficient radio frequency (RF) channel capacity for one or more uplink audio channels, such as channels for transmitting information from a wireless microphone unit 110 to the central access point 120.

Furthermore, the system 100 may include additional RF bandwidth for the purpose of carrying control signals, which may include channel requests (e.g., access requests) as well as other control information shared between the wireless microphone units 110 and the central access point 120. For instance, the system 100 may include one or more wireless "backchannels" or communication channels between one or more of the wireless microphone units 110 and the central access point 120. These wireless backchannels may enable communication of various data (e.g., control data, metrics or levels associated with the wireless microphone unit and any input audio signal, etc.) in both directions. That is, communication via the wireless backchannel can include transmitting data from the wireless microphone unit 110 to the central access point 120, and vice versa. These wireless backchannels may enable communication between a wireless microphone unit 110 and the central access point 120 both while the wireless microphone unit 110 is transmitting audio data and when it is not transmitting audio data. The wireless backchannel for a given wireless microphone unit 110 may be separate from a communication channel granted for the purpose of transmitting audio data.

Figure 2:
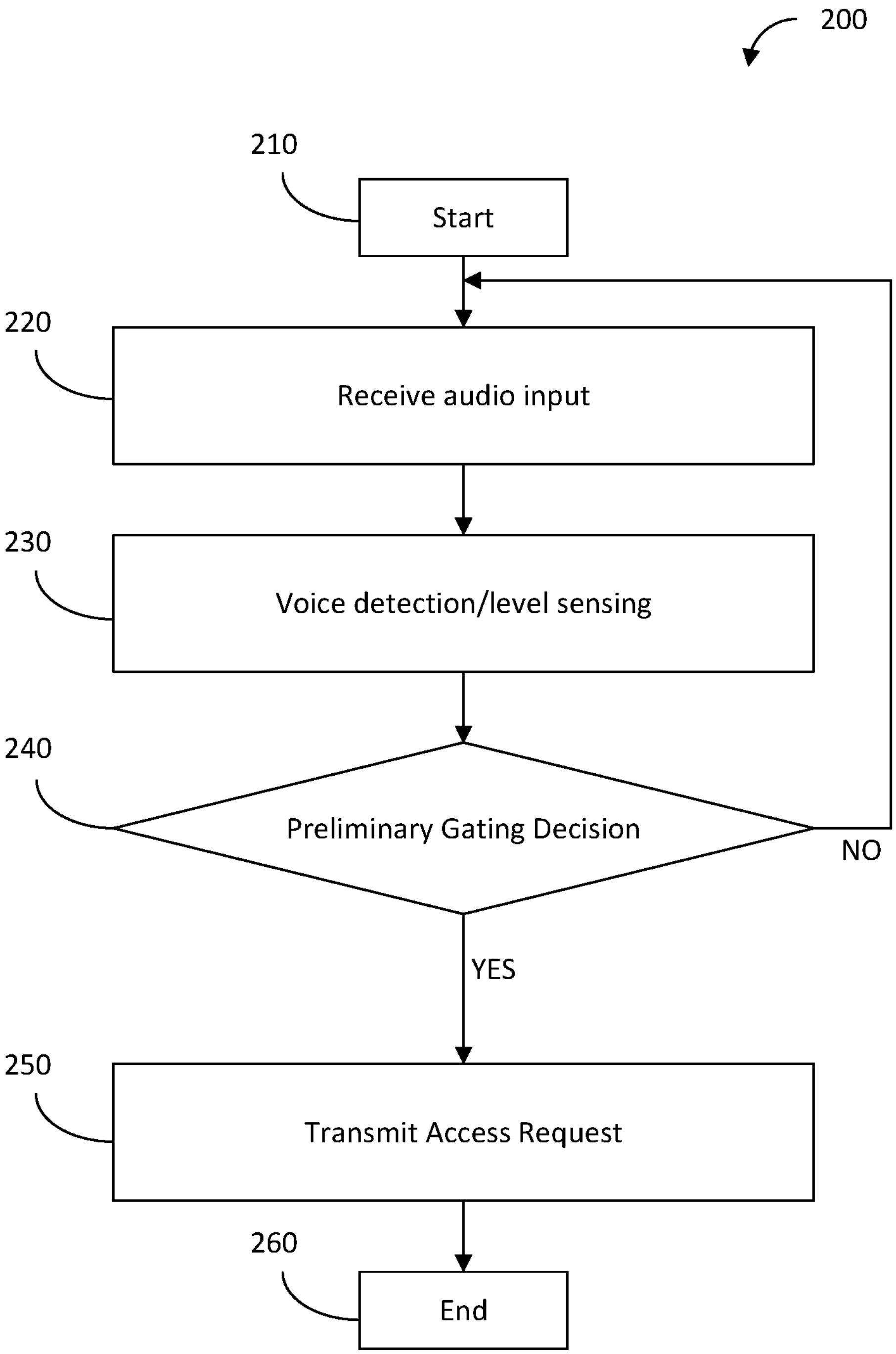
FIG. 2 is a flowchart illustrating operations performed by the wireless microphone units when an audio signal is detected, in accordance with some embodiments.
Figure 3:
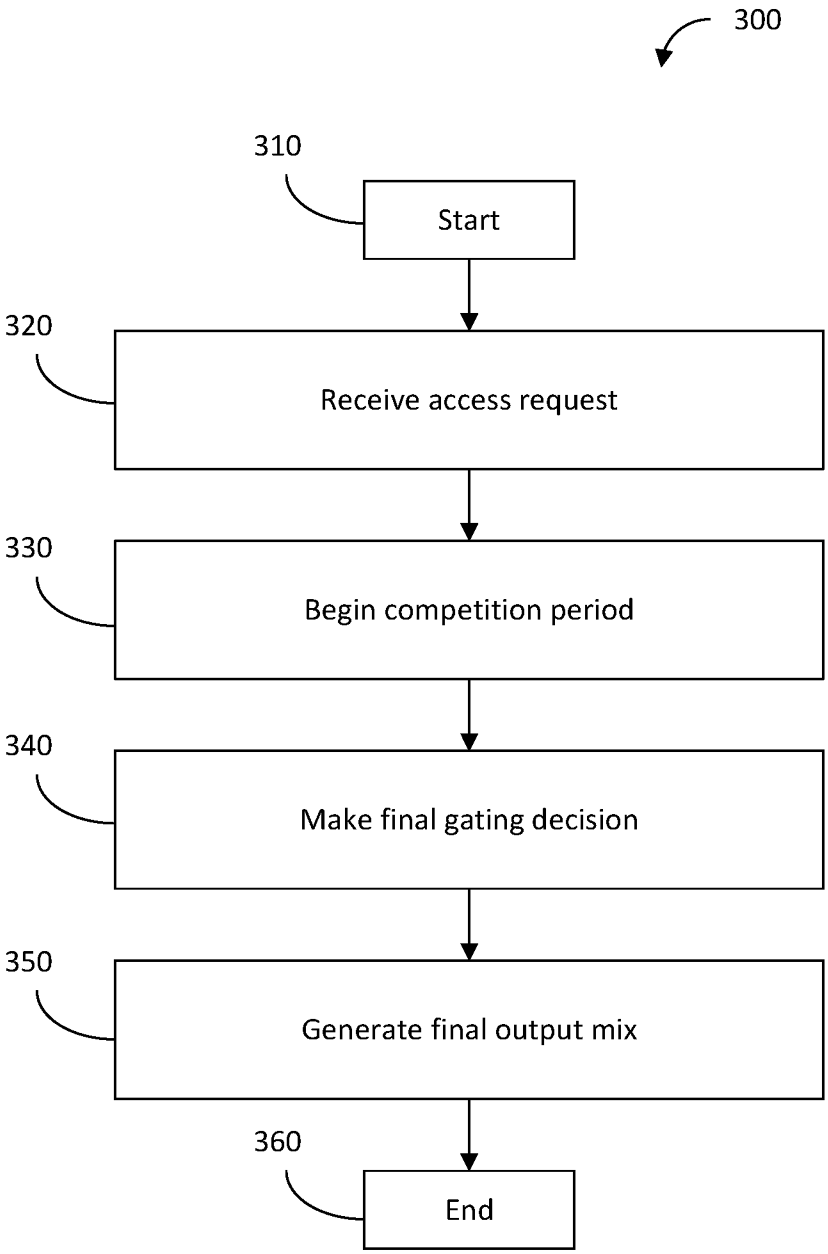
FIG. 3 is a flowchart illustrating operations performed by the central access point, in accordance with some embodiments.

FIG. 2 includes a flow chart illustrating example functions that may be performed by the wireless microphone units 110, and FIG. 3 includes a flow chart illustrating example functions that may be performed by the central access point 120. One or more processors and/or other processing components (e.g., analog to digital converters, encryption chips, etc.) within the wireless microphone units 110 and/or central access point 120 may perform any, some, or all of the steps of the processes 200 and 300 of FIGS. 2 and 3. One or more other types of components (e.g., memory, input and/or output devices, transmitters, receivers, buffers, drivers, discrete components, etc.) may also be utilized in conjunction with the processors and/or other processing components to perform any, some, or all of the steps of the processes 200 and 300.

Beginning with FIG. 2, process 200 starts at block 210. At block 220, a wireless microphone unit 110 may detect and receive audio input. In particular, a wireless microphone unit 110 may detect sound in the environment and convert the sound to an analog or digital audio signal via the use of one or more microphone elements of the wireless microphone unit 110. The microphone elements of the wireless microphone unit 110 may be any suitable type of transducer that can detect the sound from an audio source and convert the sound to an electrical audio signal. In an embodiment, the microphone elements may be micro-electrical mechanical system (MEMS) microphones. In other embodiments, the microphone elements may be condenser microphones, balanced armature microphones, electret microphones, dynamic microphones, and/or other types of microphones. In embodiments, the microphone elements may be arrayed in one dimension or two dimensions.

In some embodiments, the microphone elements may be arranged in concentric rings and/or harmonically nested. The microphone elements may be arranged to be generally symmetric, in some embodiments. In other embodiments, the microphone elements may be arranged asymmetrically or in another arrangement. In further embodiments, the microphone elements may be arranged on a substrate, placed in a frame, or individually suspended, for example. In embodiments, the microphone elements may be unidirectional microphones that are primarily sensitive in one direction. In other embodiments, the microphone elements may have other directionalities or polar patterns, such as cardioid, subcardioid, or omnidirectional, as desired.

In some examples, the input audio signal may be stored in a circular buffer of the wireless microphone unit 110, such that a certain time period of audio is constantly stored and updated (e.g., the previous 100 ms, 200 ms, or some other period of time).

At block 230, the wireless microphone unit 110 may perform voice detection and level sensing of the received audio input. This may include classification of the input signal as containing speech or not containing speech. It may also include calculating one or more metrics associated with the input audio signal, such as a signal to noise ratio (SNR), an absolute level (e.g., a power level in decibels), etc. Further, the wireless microphone unit 110 may determine a time stamp corresponding to the input audio signal and/or the determination of the one or more metrics, such that there is a time stamp associated with when the audio signal was received and/or when the metrics were determined.

At this time in the process (e.g., after the audio signal is received), the wireless microphone unit 110 may also take one or more actions to mitigate undesirable noise or audio such as handling noise. As noted above, this may include classifying the input signal as containing voiced speech, unvoiced speech, or non-speech. This classification can then be used as a part of the preliminary gating decision (i.e., in block 240 described below). Furthermore, the classification can be used during a short window of time even after a channel has been granted to a given wireless microphone unit 110, in order to enable the central access point 120 to issue a quick release of the granted channel in the event that the classification is of non-speech, and that classification is received by the central access point 120 after the channel has already been granted. In some embodiments, the wireless microphone units 110 may send a "release channel" control message to the central access point 120 to cause the central access point 120 to release the channel, if and when non-speech classifications are made within the short time window after a channel is granted.

At block 240, the wireless microphone unit 110 may make a preliminary gating decision, which may be an estimate about whether the wireless microphone unit 110 should be granted a communication channel with the central access point 120. To make the preliminary gating decision, the wireless microphone unit 110 may determine whether one or more criteria are met (e.g., whether the input audio includes speech). The wireless microphone unit 110 may also compare the one or more determined metrics of the input audio signal to one or more thresholds. The thresholds may be static thresholds, such as (1) SNR, (2) basic level measurement (BLM), (3) absolute power level, etc. The thresholds may also be dynamic thresholds, which may change based on the particular levels associated with the system, and in particular with other gated on wireless microphone units 110 and/or active communication channels. For instance, these dynamic thresholds may include (1) a MAXBLM threshold, and (2) a MAXBUS threshold. Various other metrics and thresholds may be used as well. The thresholds are described in more detail below.

A BLM value may refer to a measure of a power level of an audio signal. The BLM value may be positive and can be lowpass-filtered so that the effects of high-frequency content are negligible. When converted to decibels, the BLM value may be represented in dBFS, e.g., relative to full-scale, in which case the values may be negative (full-scale is 0 dB).

The MAXBLM threshold may refer to the maximum BLM measurement for all wireless microphone units 110 that are currently gated on. The system can include active signaling loops for each gated on wireless microphone unit 110, which enables the wireless microphone unit 110 to regularly transmit the measured BLM values along with other data to the central access point 120. The central access point 120 may then determine the maximum BLM value from all of the gated on wireless microphone units 110, and the MAXBLM value can be transmitted to the wireless microphone unit 110 and be used as a threshold for the preliminary gating decision.

The MAXBUS value may be similar in some respects to the MAXBLM threshold. In some examples, an advantage may be given to wireless microphone units 110 that are already gated on and have a communication channel granted. This may be called the MAXBUS ADVANTAGE, and it may be a fixed value that is added to the raw BLM value for wireless microphone units 110 which have already been granted a channel. This advantage may enable the system to prioritize channels which are currently active. The MAXBUS value may be determined by the central access point 120 as the maximum BLM value for all gated on wireless microphone unit 110 added to the MAXBUS ADVANTAGE value.

Other metrics may be used as well in the preliminary gating decision. For example, there may be an inactive MAXBLM threshold, which can be determined to be the maximum BLM for wireless microphone units 110 which have not been granted a channel or are not gated on. Wireless microphone units 110 that are not gated on may have an inactive signaling loop with the central access point 120, in which the wireless microphone units 110 periodically transmit information (e.g., BLM) to the central access point 120 via control packets, since they do not have an active communication channel for audio data.

In some examples, the system may include automatic gain control functionality, and/or feedback reduction (also known as dynamic feedback reduction). Regarding automatic gain control, the wireless microphone unit 110 may adjust the level of an input audio signal to achieve a consistent desired target power level. The wireless microphone unit 110 may automatically adapt the gain and/or attenuation level corresponding to the input audio signal, based on characteristics or metrics of the input audio signal while desirable sound is detected (e.g., speech). This automatic gain control may result in a more balanced mix output by the central access point 120, such as by normalizing levels across all input audio signals. This may assist in compensating for input level differences due to loud or soft talkers, people who speak near or far from a wireless microphone unit 110, an audio source being on or off axis from a wireless microphone unit 110 if the unit includes directional microphones, and/or for various other reasons.

One or more wireless microphone units 110 may also include circuitry and functionality related to feedback reduction or dynamic feedback reduction. The wireless microphone unit 110 may detect the presence of audio feedback in the input audio signal, and responsively deploy one or more filters based on the characteristics or metrics of the feedback, in order to reduce or eliminate the feedback effect. Dynamic feedback reduction may be performed by the wireless microphone unit 110 on an input audio signal, in particular where the wireless microphone unit 110 has been granted a communication channel and is in the process of transmitting the input audio to the central access point 120. In an exemplary scenario, the input audio signal is being transmitted to the central access point 120 (where the input audio signal is included in the final output mix), and the output mix is picked up by the wireless microphone unit 110. The wireless microphone unit 110 may pick up the output mix which includes the input audio signal, which may cause the feedback to occur. This feedback can then by mitigated by deploying one or more filters as appropriate.

With respect to the preliminary gating decision (e.g., when the wireless microphone unit 110 has not yet been granted an active communication channel), there may not be the typical feedback as noted in the scenario mentioned above (e.g. the wireless microphone unit 110 picking up the final output mix which includes the input audio from the wireless microphone unit 110). However, the dynamic feedback reduction functionality may be used in a different manner to assist with the preliminary gating decision. In particular, when multiple wireless microphone units 110 are present, a first wireless microphone unit 110 may cause a feedback signal to occur, e.g., through the typical process of transmitting its corresponding input audio signal and picking up the output mix that includes the input audio signal. This undesirable feedback signal may then be picked up by one or more other wireless microphone units 110, such as a unit that is adjacent or nearby the first wireless microphone unit 110. The second wireless microphone unit 110 may interpret the feedback signal as a desirable input audio signal, which may result in a positive preliminary gating decision by the second wireless microphone unit 110. However, since this feedback signal is undesirable, instead of making a positive preliminary gating decision, the second wireless microphone unit 110 may instead use its dynamic feedback reduction capabilities to address the feedback signal, and determine that it is not a desirable input audio signal. The second wireless microphone unit 110 can then make a negative preliminary gating decision based on its recognition that the input audio signal is simply a feedback signal, and is not a desirable input audio signal. In this manner, a wireless microphone unit 110 may use dynamic feedback reduction as a mechanism for preventing positive preliminary gating decisions (and thus preventing access requests from being sent) when the input audio signal includes feedback or has feedback characteristics.

If a wireless microphone unit 110 determines that the input audio signal meets one or more criteria and/or is above one or more thresholds, then the wireless microphone unit 110 may make a preliminary gating decision of YES at block 240. However, if the wireless microphone unit 110 determines that the input audio signal does not meet one or more criteria and/or is not above one or more thresholds at block 240, then the wireless microphone unit 110 may make a preliminary gating decision of NO. The process 200 may proceed back to block 220 where the wireless microphone unit 110 may receive a new input audio signal.

It should be appreciated that while the embodiment illustrated above describes that wireless microphone unit 110 may make a preliminary gating decision of YES at block 240 based on whether the input audio signal meets one or more criteria and/or is above one or more thresholds, in other embodiments, the wireless microphone unit 110 may make a preliminary gating decision of NO at block 240 based on whether the input audio signal does not meet one or more criteria and/or is below one or more thresholds.

If the wireless microphone unit 110 makes a positive preliminary gating decision ("YES") at block 240, at block 250 the wireless microphone unit 110 may transmit an access request to the central access point 120. The access request may include a request for a wireless communications channel to be granted to the wireless microphone unit 110, and/or include various metrics and data concerning the input audio signal (e.g., BLM, SNR, timestamp, etc.). While the term "access request" may be used herein, other terms may be used as well such as "speak request" or "enhanced speak request." A purpose of the access request is to enable the wireless microphone unit 110 to request that the central access point 120 grant a communication channel for the purpose of transmitting the input audio signal from the wireless microphone unit 110 to the central access point 120. As such, while many of the access requests may pertain to requests from the wireless microphone unit 110 to transmit speech, it should be understood that the access request may pertain to other requests for access, such as, but not limited to, a music request, a data transmission request, and/or any other reason for which the wireless microphone unit 110 would want a channel granted.

In some examples where the wireless microphone unit 110 is configured to make a determination whether the input audio signal comprises speech or non-speech, there may be a delay in making this determination. In some cases, the delay may be variable and/or unknown due to the processing time required to make the determination, and/or due to the determination being based on the generation of a confidence level (e.g., when obtaining a higher quality confidence level based on a longer input audio signal and/or longer processing time). In these cases, the wireless microphone unit may make an initial determination that the input audio signal should be transmitted to the central access point 120, and may subsequently be granted a channel. However, if the wireless microphone unit 110 performs additional processing and later determines that the input audio signal does not include speech (and therefore should not be granted a channel), the wireless microphone unit 110 may transmit a release channel control message to the central access point 120 in order to release the channel.

The above scenario describes the case where a wireless microphone unit 110 makes an initial decision to transmit an access request (e.g., an enhanced speak request) and later determines that the request was made in error, and therefore transmits a release channel control message. The wireless microphone unit 110 may perform similar steps where the input audio signal is relatively short in duration, e.g., where the input audio signal has stopped by the time the channel is granted and set up for communication. In this case, the wireless microphone unit 110 may also transmit a release channel control message to release the channel. An example of an audio signal that is relatively short in duration includes when a book or other object is dropped and the sound is picked up by the wireless microphone unit 110, or when the wireless microphone unit 110 is being handled to be moved.

Referring now to FIG. 3, process 300 begins at block 310. At block 320, the central access point 120 may receive a first access request from a wireless microphone unit 110. Receiving the first access request may begin a series of events, which are described in further detail below with respect to the timing diagram shown in FIG. 4.

At block 330, in response to receiving a first access request from a first wireless microphone unit 110, the central access point 120 may begin a competition period. During the competition period, it may be expected that additional access requests may be received from additional wireless microphone units 110 which may have picked up the same audio source as the first wireless microphone unit 110 (albeit possibly delayed slightly due to being different distances from the audio source). The central access point 120 may store the first access request and/or the corresponding signal metrics in a buffer. During the competition period, if additional access requests are received from other wireless microphone units 110, the signal metrics may be extracted and compared to the previously received data. The best signal metrics (and the corresponding wireless microphone unit 110) may be updated until the end of the competition period, at which time the "winning" wireless microphone unit 110 may be determined.

At block 340, the central access point 120 may make a final gating decision, which includes selecting the winning wireless microphone unit 110. The winning wireless microphone unit 110 may be the wireless microphone unit 110 having an audio signal that has the highest SNR, highest absolute level, best level of some other metric, earliest corresponding time stamp, and/or for some other reason. In some cases where the system operates using data packets, some requests and/or packets may be lost or delayed during transmission to the central access point 120. However, it may be desirable to select the wireless microphone unit 110 that is closest to a talker (e.g., the wireless microphone unit 110 that picked up the speech first), and which may include the second or subsequent access request if, for example, such a request has an earlier timestamp corresponding to when the input audio was received at the second or subsequent wireless microphone unit 110. This may occur even though the second or subsequent access request was received by the central access point 120 after the first access request of the first wireless microphone unit 110. In some examples, selecting the winning wireless microphone unit 110 may be performed by examining time stamps down to the subframe level (e.g., with a resolution of approximately 1 ms).

In some examples, the central access point 120 may factor in noise when making a decision about which wireless microphone unit 110 is the winner. For example, a higher noise level from a particular wireless microphone unit 110 may indicate that this wireless microphone unit 110 is closer to the source of the noise, since noise typically attenuates based on distance.

Additionally, in further examples, the central access point 120 may factor in system channel capacity when determining which wireless microphone unit 110 is the winner, and/or whether to select a winning wireless microphone unit 110 at all. For instance, if the maximum number of channels are already being utilized in the system, no wireless microphone unit 110 may be selected as the winner.

When a winning wireless microphone unit 110 is selected during the final gating decision process of block 340, the central access point 120 may grant a communication channel for audio data to the winning wireless microphone unit 110. The central access point 120 may generate a final output mix audio signal at block 350. The final output mix audio signal may reflect the desired audio mix of signals from the wireless microphone units 110, and/or one or more other audio sources which may be connected to the central access point 120 either wirelessly or via wired connections. In embodiments, the final output mix audio signal may be transmitted to a remote location (e.g., far end of a conference) and/or be played in the environment for sound reinforcement, for example.

In some examples, the central access point 120 may differentiate between (1) access requests received from wireless microphone units 110 with the capability and functions described herein, and (2) ordinary channel requests received from wireless microphone units or devices without the functionality described herein. The ordinary channel requests may be processed independently or separately from the process described herein.

Figure 4:
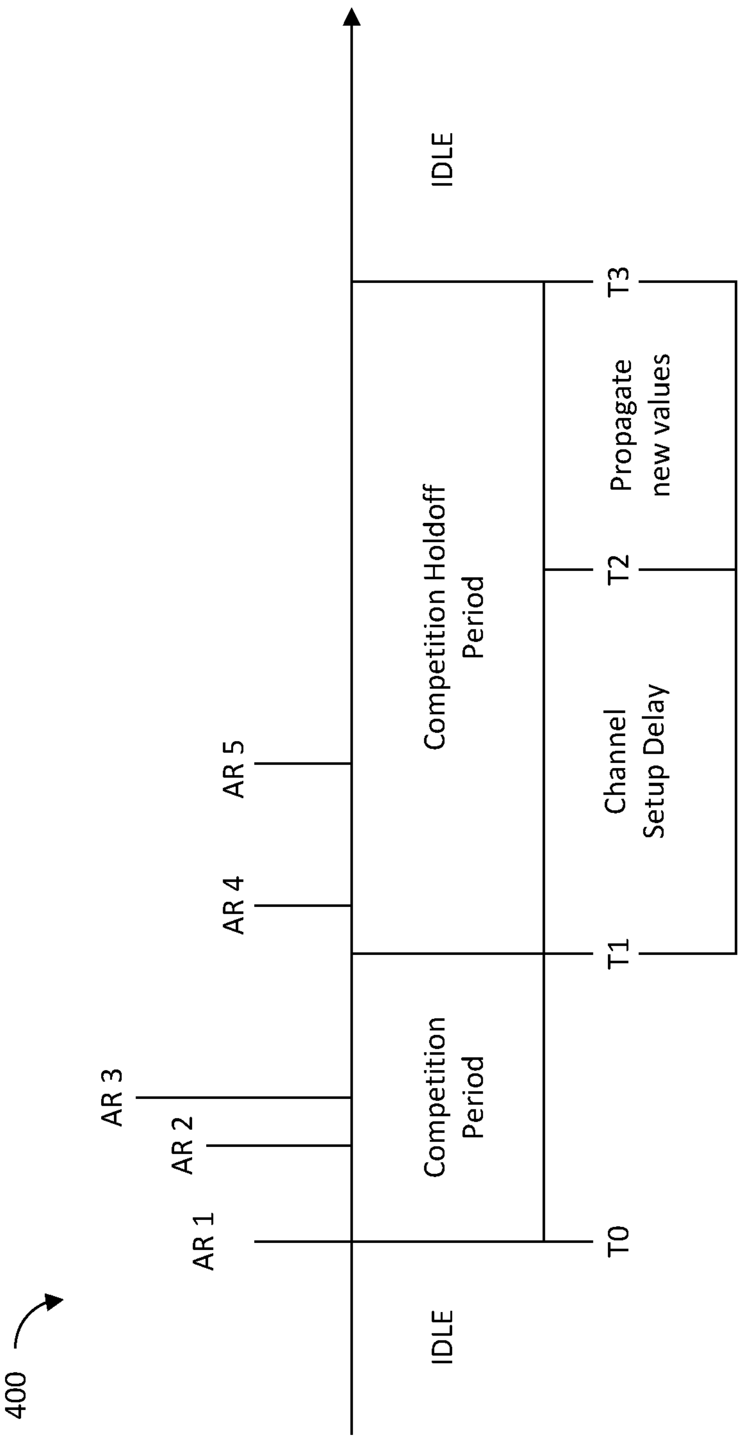
FIG. 4 is a timing diagram illustrating the timing of certain events performed by the wireless microphone unit and the central access point, in accordance with some embodiments.

FIG. 4 illustrates a timing diagram showing the timing of various stages of the central access point 120 during the process of selecting a winning wireless microphone unit 110. In FIG. 4, prior to time T0, several wireless microphone units 110 may receive input audio from an audio source. Each wireless microphone unit 110 may make a preliminary gating decision, and several of the wireless microphone units 110 may transmit access requests (AR) to the central access point 120.

At time T0, the first AR may be received by the central access point 120. Prior to time T0, the central access point 120 may be in an idle state where it may be able to receive ARs and is operating under normal circumstances (e.g., generating a final mixed audio output).

When the first AR is received, the central access point 120 may begin a competition period. During the competition period, the central access point 120 may be able to receive subsequent ARs from various other wireless microphone units 110. As shown in FIG. 4, the central access point 120 may receive two additional ARs during the competition period, e.g., AR 2 and AR 3. The central access point 120 may compare the metrics included in the received ARs against each other to determine which AR (and thus the corresponding wireless microphone unit 110) is the winner.

A length of the competition period may be determined based on several factors. In particular, the competition period length may be determined based on the spacing of the wireless microphone units 110 and the speed of sound. The wireless microphone units 110 may be spaced apart from each other by a known distance, and based on this known distance along with the speed of sound, it can be predicted how long of a delay there will likely be between ARs received from two adjacent wireless microphone units 110 (e.g., when both wireless microphone units 110 pick up the same audio source). Additionally, the competition period duration may be determined such that it is short enough that only a limited number of wireless microphone units 110 will be able to transmit ARs based on the same audio source (e.g., when a person begins speaking and two or more wireless microphone units 110 all pick up the speech). Based on how far sound can travel in a given amount of time, utilizing a relatively short competition period length may ensure that only wireless microphone units 110 within a given distance of the first wireless microphone unit 110 to send an AR have the opportunity to send a competing AR.

At time T1, the competition period may end, and the winning AR (and therefore the winning wireless microphone unit 110) may be selected. Also at time T1, a competition holdoff period may begin. All ARs received during the competition holdoff period may be blocked or ignored by the central access point 120 (e.g., AR 4 and AR 5 shown in FIG. 4). In practice, AR 1, AR 2, AR 3, AR 4, and AR 5 may correspond to the closest wireless microphone units 110, in order of distance, to an audio source. In this scenario, it may be desirable to block requests from the fourth and fifth closest wireless microphone units 110 given that there are three closer candidates to choose from. In some examples, ARs received during the competition holdoff period may be ignored, and the wireless microphone units 110 making these requests may time out and transmit a new request later and/or retransmit the request, which can result in starting a new competition period, e.g., after time T3 when requests can be received and processed again.

Between time T1 and time T2, the winning wireless microphone unit may be granted a wireless communication channel, and the channel setup procedure may be carried out. The winning wireless microphone unit 110 may also begin to transmit audio via the granted communication channel.

Between time T2 and time T3, the central access point 120 may transmit new metrics (e.g., MAXBUS, MAXBLM, etc.) to the wireless microphone units 110 for use in making their preliminary gating decisions. The updated metrics may be useful to the wireless microphone units 110 at this stage, since the winning wireless microphone unit 110 has just been granted a communication channel and there may be new metrics for the other wireless microphone units 110 to use in their decision making.

At the end of the competition holdoff period (time T3), new ARs can again be received. The next received AR after time T3 may begin a new competition period for the next available channel. However, the previous winning wireless microphone unit 110 may remain active on the previously granted channel.

The length of the competition holdoff period may be determined based on various factors, including: (1) the amount of time required to grant a channel to the winning wireless microphone unit 110 (e.g., longer required time to grant means a longer competition holdoff period), (2) based on a need to allow time for the winning wireless microphone unit 110 to begin transmitting audio on the granted channel, and/or (3) based on the time required to update and transmit the updated metrics to the other wireless microphone units 110 (e.g., MAXBUS, MAXBLM, or other relevant metrics). Delaying the start of the next competition period may ensure that the next competition period reflects requests from wireless microphone units 110 that have already incorporated the new metrics into their preliminary gating decisions.

In general, a computer program product in accordance with the embodiments includes a computer usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to implement the methods described below. In this regard, the program code may be implemented in any desired language, and may be implemented as machine code, assembly code, byte code, interpretable source code or the like (e.g., via C, C++, Java, ActionScript, Objective-C, JavaScript, CSS, XML, and/or others).

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed.

Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A wireless audio system, comprising:
a plurality of wireless microphone units each configured to:
determine a preliminary gating decision at least partially based on a metric associated with an audio input signal; and
wirelessly transmit an access request based on the preliminary gating decision, wherein the access request is for requesting a grant of a wireless communication channel; and
a central access point in wireless communication with the plurality of wireless microphone units, the central access point configured to grant the wireless communication channel for a selected designated wireless microphone unit of the plurality of wireless microphone units, at least partially based on at least one access request received from at least one of the plurality of wireless microphone units.

2. The wireless audio system of claim 1, wherein the plurality of wireless microphone units are each further configured to determine the preliminary gating decision at least partially based on a metric received from the central access point.

3. The wireless audio system of claim 1, wherein the plurality of wireless microphone units are each further configured to:
perform dynamic feedback reduction on the audio input signal; and
determine the preliminary gating decision at least partially based on the dynamic feedback reduction performed on the audio input signal.

4. The wireless audio system of claim 1, wherein the central access point is further configured to, responsive to receiving the at least one access request, select a designated wireless microphone unit based on the at least one access request.

5. The wireless audio system of claim 1, wherein the central access point is further configured to, responsive to receiving the at least one access request:
initiate a competition period;
receive subsequent access requests during the competition period from other wireless microphone units of the plurality of wireless microphone units; and
select a designated wireless microphone unit based on the at least one access request and the subsequent access requests.

6. The wireless audio system of claim 5, wherein the central access point is further configured to select the designated wireless microphone unit by:
selecting the at least one access request as a designated access request;
processing each of the subsequent access requests in the order received;
updating the designated access request based on the processing of the subsequent access requests; and
at the end of the competition period, select the designated wireless microphone unit based on the updated designated access request.

7. The wireless audio system of claim 1,
wherein the plurality of wireless microphone units are each further configured to:
determine whether to classify the audio input signal as non-speech during a predetermined time duration after the wireless communication channel has been granted; and
wirelessly transmit a channel release request to the central access point, when the audio input signal is classified as non-speech; and
wherein the central access point is further configured to release the granted wireless communication channel, responsive to the channel release request.

8. The wireless audio system of claim 1, wherein the central access point is further configured to output a final mixed audio signal including the audio input signal received via the granted wireless communication channel.

9. The wireless audio system of claim 1, wherein the plurality of wireless microphone units are each further configured to responsive to the grant of the wireless communication channel, initiate playback of a time-compressed audio signal that is generated based on the audio input signal.

10. A method, comprising:
determining, at each of a plurality of wireless microphone units, a preliminary gating decision at least partially based on a metric associated with an audio input signal;
wirelessly transmitting, from at least one of the plurality of wireless microphone units to a central access point, an access request based on the preliminary gating decision, wherein the access request is for requesting a grant of a wireless communication channel; and
granting, by the central access point, the wireless communication channel for a selected designated wireless microphone unit of the plurality of wireless microphone units, at least partially based on the access requests received from the plurality of wireless microphone units.

11. The method of claim 10, further comprising determining, at each of the plurality of wireless microphone units, the preliminary gating decision at least partially based on a metric received from the central access point.

12. The method of claim 10, further comprising, by each of the plurality of wireless microphone units:
performing dynamic feedback reduction on the audio input signal; and
determining the preliminary gating decision at least partially based on the dynamic feedback reduction performed on the audio input signal.

13. The method of claim 10, further comprising responsive to receiving the access requests, selecting, by the central access point, a designated wireless microphone unit based on the access requests.

14. The method of claim 10, further comprising, by the central access point:
initiating a competition period;
receiving subsequent access requests during the competition period from other wireless microphone units of the plurality of wireless microphone units; and
selecting a designated wireless microphone unit based on the access requests and the subsequent access requests.

15. The method of claim 14, wherein selecting the designated wireless microphone unit comprises, by the central access point:

selecting one of the access requests as a designated access request;

processing each of the subsequent access requests in the order received;

updating the designated access request based on the processing of the subsequent access requests; and at the end of the competition period, select the designated wireless microphone unit based on the updated designated access request.

16. The method of claim 10, further comprising:

determining, by each of the plurality of wireless microphone units, whether to classify the audio input signal as non-speech during a predetermined time duration after the wireless communication channel has been granted;

wirelessly transmit a channel release request from at least one of the plurality of wireless microphone units to the central access point, when the audio input signal is classified as non-speech; and responsive to the channel release request, releasing, by the central access point, the granted wireless communication channel.

17. The method of claim 10, further comprising outputting, by the central access point, a final mixed audio signal including the audio input signal received via the granted wireless communication channel.

18. The method of claim 10, further comprising responsive to the grant of the wireless communication channel, initiating, by each of the plurality of wireless microphone units, playback of a time-compressed audio signal that is generated based on the audio input signal.

19. A wireless microphone unit configured to:

detect an audio input signal;

determine a metric associated with the audio input signal;

determine, at least partially based on the metric, a preliminary gating decision; and responsive to the preliminary gating decision being a positive gating decision, wirelessly transmit an access request to a central access point, the access request for requesting a grant of a wireless communication channel between the wireless microphone unit and the central access point.

20. The wireless microphone unit of claim 19, wherein the wireless microphone unit is further configured to determine the preliminary gating decision at least partially based on a metric received from the central access point.

21. The wireless microphone unit of claim 19, wherein the wireless microphone unit is further configured to perform dynamic feedback reduction on the audio input signal, and to determine the preliminary gating decision at least partially based on the dynamic feedback reduction performed on the audio input signal.

* * * * *